(12) United States Patent
Erb et al.

(10) Patent No.: US 10,287,019 B2
(45) Date of Patent: May 14, 2019

(54) SEATING DEVICE

(71) Applicant: RECARO Aircraft Seating GmbH & Co. KG, Schwaebisch Hall (DE)

(72) Inventors: Andreas Erb, Schwaebisch Hall (DE); Jens Jakubowski, Schwaebisch Gmuend (DE); Zoltan Jussli, Bretzfeld (DE); Christoph Schuerg, Schwaebisch Hall (DE); Christoph Bich, Abtsgmuend (DE); Christopher Tute, Schoenborn (DE); Maik Thiele, Heppenheim (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 13 days.

(21) Appl. No.: 15/538,370

(22) PCT Filed: Dec. 23, 2015

(86) PCT No.: PCT/EP2015/081217
§ 371 (c)(1),
(2) Date: Sep. 15, 2017

(87) PCT Pub. No.: WO2016/102699
PCT Pub. Date: Jun. 30, 2016

(65) Prior Publication Data
US 2018/0162533 A1    Jun. 14, 2018

(30) Foreign Application Priority Data
Dec. 23, 2014   (DE) ........................ 10 2014 119 611

(51) Int. Cl.
*B64D 11/06* (2006.01)
*B60N 2/68* (2006.01)
(Continued)

(52) U.S. Cl.
CPC .......... *B64D 11/064* (2014.12); *B60N 2/2222* (2013.01); *B60N 2/686* (2013.01);
(Continued)

(58) Field of Classification Search
CPC .............. B64D 11/064; B64D 11/0639; B64D 11/0641; B64D 11/0646
(Continued)

(56) References Cited

U.S. PATENT DOCUMENTS 4,291,916 A    9/1981   Chardon
4,790,496 A    12/1988  Marrujo
(Continued)

FOREIGN PATENT DOCUMENTS

DE          29 11 027 A1    5/1980
DE   10 2009 011 387 A1    9/2010
(Continued)

OTHER PUBLICATIONS

Search Report dated Dec. 18, 2015 issued in corresponding DE patent application No. 10 2014 119 611.2 (and partial English translation).
(Continued)

*Primary Examiner* — Mark R Wendell
(74) *Attorney, Agent, or Firm* — Posz Law Group, PLC

(57) ABSTRACT

A seating device, in particular a flight passenger seating device, includes at least one seat bottom unit and with a backrest unit that is connected to the seat bottom unit, wherein at least the backrest unit is positionable in a comfort position and in a further sitting position.
The comfort position is implemented as a base position that is optimized for a passenger comfort.

15 Claims, 11 Drawing Sheets

Figure 1:
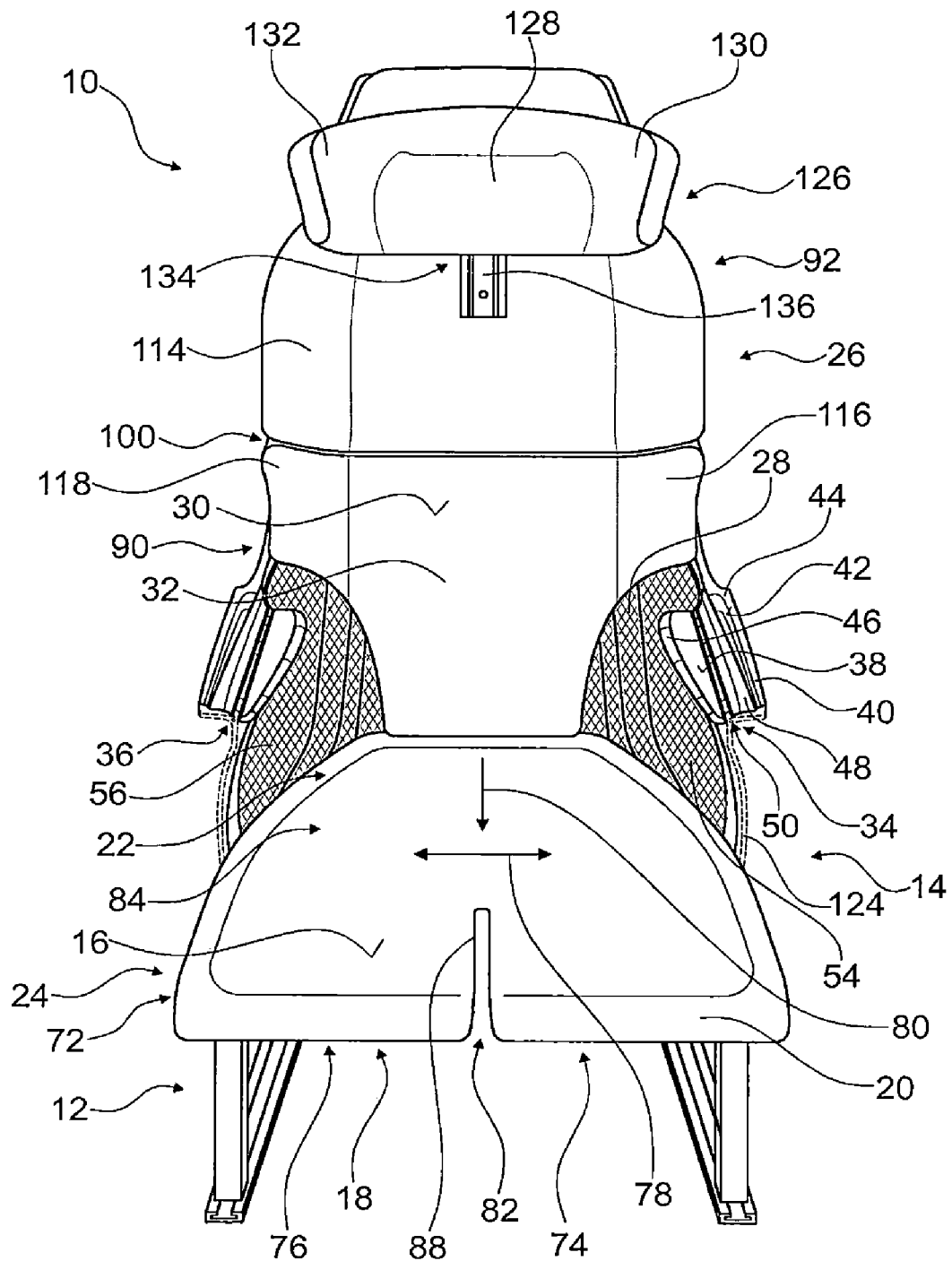

(51) Int. Cl.
  *B60N 2/70* (2006.01)
  *B60N 2/22* (2006.01)
  *B60N 2/809* (2018.01)
(52) U.S. Cl.
  CPC ............ *B60N 2/7011* (2013.01); *B60N 2/809* (2018.02); *B64D 11/0639* (2014.12); *B64D 11/0641* (2014.12); *B64D 11/0646* (2014.12); *Y02T 50/46* (2013.01)
(58) Field of Classification Search
  USPC ........................................................ 297/232
  See application file for complete search history.

(56) References Cited

U.S. PATENT DOCUMENTS

| | | | | |
|---|---|---|---|---|
| 6,595,586 | B2* | 7/2003 | Brightbill | A47C 3/025 |
| | | | | 297/312 |
| 7,475,943 | B1* | 1/2009 | Huang | A47C 7/405 |
| | | | | 297/284.4 |
| 9,358,913 | B2* | 6/2016 | Schurg | B60N 2/2222 |
| 2005/0093352 | A1 | 5/2005 | Yasuda et al. | |
| 2008/0246322 | A1 | 10/2008 | Opsvik | |
| 2012/0048999 | A1* | 3/2012 | Schurg | B60N 2/2222 |
| | | | | 244/118.6 |

FOREIGN PATENT DOCUMENTS

| | | |
|---|---|---|
| DE | 10 2013 001 190 A1 | 7/2014 |
| EP | 0 639 479 A1 | 2/1995 |
| FR | 2 768 243 A1 | 3/1999 |
| JP | H06-072218 | 3/1994 |
| JP | H10-075847 A | 3/1998 |
| WO | 87/03256 A1 | 6/1987 |
| WO | 03/063650 A2 | 8/2003 |
| WO | 2014/121038 A1 | 8/2014 |

OTHER PUBLICATIONS

International Search Report of the International Searching Authority dated Apr. 6, 2016 issued in corresponding International Application No. PCT/EP2015/081217.
International Preliminary Report on Patentability dated Jul. 6, 2017 issued in corresponding International Application No. PCT/EP2015/081217.

* cited by examiner

SEATING DEVICE

CROSS REFERENCE TO RELATED APPLICATIONS

This application is a U.S. national stage application of PCT/EP2015/081217 filed on Dec. 23, 2015, which is based on German Patent Application No. 10 2014 119 611.2 filed on Dec. 23, 2014, the contents of which are incorporated herein by reference.

STATE OF THE ART

The invention relates to a seating device according to the preamble of patent claim 1.

A seating device, in particular a flight passenger seating device, has already been proposed, with at least one seat bottom unit and with a backrest unit that is connected to the seat bottom unit, wherein at least the backrest unit is positionable in a comfort position and in a further sitting position.

The objective of the invention is in particular to provide a generic device with improved characteristics regarding a passenger comfort. The objective is achieved, according to the invention, by the features of patent claim 1, while advantageous implementations and further developments of the invention will become apparent from the dependent claims.

ADVANTAGES OF THE INVENTION

The invention is based on a seating device, in particular a flight passenger seating device, with at least one seat bottom unit and with a backrest unit that is connected to the seat bottom unit, wherein at least the backrest unit is positionable in a comfort position and in a further sitting position.

It is proposed that the comfort position is implemented as a base position that is optimized for a passenger comfort. By a "seating device" is herein in particular a device to be understood which forms at least a portion or an entire seat, e.g. in particular a flight passenger seat. The seating device herein in particular forms a flight passenger seat, which is embodied as an economy class seat or a premium economy class seat that is in particular intended for medium range or long range flights. The seating device herein preferably implements in particular a flight passenger seat with a base area of more than 0.5 sqm available to a passenger. By a "flight passenger seat" is herein in particular a seat to be understood which is mounted in an airplane cabin of an airplane. Herein the flight passenger seat is preferentially implemented as part of a plurality of flight passenger seats which are arranged side by side. The flight passenger seat herein comprises in particular at least a seat bottom unit forming a seating area for a passenger, a backrest unit providing a backrest support surface on which a passenger sitting in the flight passenger seat may brace himself with his back, and at least one armrest unit, on which the passenger may rest an arm at least partially. By a "seat bottom unit" is herein in particular a unit to be understood which forms the seating area for a passenger, wherein the seat bottom unit is herein preferably implemented by a base body and a cushion unit that is mounted on the base body. By a "seating area" is herein in particular a region of the flight passenger seat to be understood which is configured for a passenger sitting on it, in particular during a flight. The seating area is herein implemented by the seat bottom unit, which preferentially comprises at least a base body and a cushioning element that is mounted to the base body and forms the seating area. By a "backrest unit" is herein in particular a unit of the flight passenger seat to be understood which forms a backrest support surface on which the passenger sitting on the flight passenger seat may rest his back. The backrest unit herein preferably comprises at least a base body and a cushioning element which forms the backrest support surface. The backrest unit is herein arranged on a rear end of the seat bottom unit and extends from the seat bottom unit upwards, away from a mounting unit. A "comfort position" is herein in particular to mean a position of the seating device in which a backrest unit of the seating device has an inclination that is pivoted out of a TTL position backwards, allowing an advantageously comfortable, non-upright sitting position for a passenger. A "further sitting position" is herein in particular to mean a sitting position in which in particular the backrest unit has a different inclination with respect to a cabin floor than in the comfort position. A further sitting position is herein implemented, for example, as a TTL position. A "TTL position" is herein in particular to mean an upright position of the flight passenger seat, which has to be taken for safety reasons, in particular in a take-off phase, in a landing phase and during turbulences. Herein in the TTL position a backrest unit of the flight passenger seat and the seat bottom are situated substantially perpendicularly to each other, preferably at an angle between 90 degrees and 105 degrees. The TTL position herein implements a first end position into which the flight passenger seat is maximally adjustable. By a "base position" is herein in particular a position to be understood for which a seat, in particular a flight passenger seat, is designed and built. In the base position the backrest unit preferably forms a substantially planar continuous surface. "Configured" is in particular to mean specifically designed and/or equipped. By an object being configured for a certain function is in particular to be understood that the object fulfills and/or executes said certain function in at least one application state and/or operating state. An implementation according to the invention allows rendering a particularly comfortable seat available to a passenger, in particular increasing a sleeping comfort and facilitating side sleep.

It is further proposed that the backrest unit comprises a rigid partial region which is rigidly coupled with the seat bottom unit. By a "rigid partial region" is herein in particular a partial region to be understood which is substantially not elastically deformable in itself. "Rigidly coupled" is herein in particular to mean the two elements which are coupled with each other, like in particular the rigid partial region of the backrest unit and the seat bottom unit, featuring a fixed orientation with respect to each other, which is non-modifiable without destruction. In this way the backrest unit and the seat bottom unit may be especially advantageously at least partly implemented together, as a result of which a particularly advantageous ergonomic situation is achievable for a passenger.

Furthermore it is proposed that the backrest unit comprises an upper partial region which is embodied in such a way that it is pivotable with respect to the rigid lower partial region. By an "upper partial region" is herein in particular a partial region of the backrest unit to be understood which forms a portion of the backrest unit that faces away from a mounting unit. Herein the upper partial region and the rigid lower partial region are preferably implemented as separate structural components. "Pivotable" is herein in particular to mean that an orientation of the upper partial region and the lower partial region with respect to each other is adjustable via a rotation relatively to one another about a shared pivot axis. This allows making a particularly advantageous backrest unit available which is especially comfortable for a passenger, in particular in a comfort position, and which is moreover displaceable into a mandatory TTL position.

It is also proposed that the seating device comprises at least one support unit, which supports the rigid lower partial region with the pivotable upper partial region, and forms a pivot axis which is offset in a seating direction frontwards with respect to a rear end of the backrest unit. By a "support unit" is herein in particular a slide bearing and/or roller bearing to be understood, by which two elements connected to each other via the support unit, like in particular the lower partial region and the upper partial region, may be pivoted with respect to each other. "Offset frontwards" is herein in particular to mean that the pivot axis is not arranged at a rear end of the backrest unit, viewed in the seating direction, but is displaced frontwards in the seating direction. In this way a particularly advantageous pivoting of the lower partial region and the upper partial region with respect to each other is achievable.

It is moreover proposed that the seating device comprises at least one laterally arranged abutment element extending from the backrest unit frontwards in a region of the support unit. By an "abutment element" is herein an element to be understood on which a passenger may support himself with a portion of his body. The seating device herein preferably comprises respectively one abutment element on both sides of the backrest unit. This allows implementing the backrest unit in an especially comfortable fashion.

Beyond this it is proposed that the backrest unit and the seat bottom unit have a sitting angle of at least 120 degrees in the base position. By a "seating angle" is herein in particular an angle to be understood which is included by the backrest unit and the seat bottom unit in a mounted state. In this way a particularly comfortable and ergonomic sitting position is achievable. By "at least 120 degrees" is herein in particular to be understood that the sitting angle included by the backrest unit and the seat bottom unit is at least 120 degrees, preferably more than 125 degrees and, in an especially advantageous implementation, more than 130 degrees.

It is further proposed that the backrest unit features in the base position an inclination of at least 120 degrees with respect to a mounting plane. By a "mounting plane" is herein in particular a plane to be understood on which the flight passenger seat is mounted with its mounting unit. The mounting plane is herein embodied by a cabin floor of the airplane in which the flight passenger seat is mounted. By an "inclination of at least 120 degrees" is herein to be understood that an angle included by the mounting plane and the backrest unit is at least 120 degrees, preferably 125 degrees and, in an especially advantageous implementation, 130 degrees. This allows orienting the backrest unit in the base position in a particularly advantageous manner.

It is furthermore proposed that the seating area of the seat bottom unit comprises a base body implementing at least in a front region at least two partial regions which are separate from each other in a transverse direction and are movable with respect to each other in height. By a "base body" is herein in particular an element to be understood which is part of a support structure and is configured for transmitting forces introduced into the seat bottom unit. By "partial regions which are separate from each other" are herein in particular two regions to be understood which are in particular spatially separate from each other, wherein preferentially a gap is situated between the two partial regions. It is principally also conceivable that a region between the two partial regions which are separate from each other is implemented by a material having in particular elastic characteristics, such that said material only slightly restricts a movement of the partial regions with respect to each other. In this way a particularly advantageous seat bottom unit may be provided.

Moreover it is proposed that the base body forms, at least in its front region, at least one slit separating the at least two partial regions from each other. This allows implementing the partial regions in a particularly simple fashion.

It is also proposed that seating device comprises at least one armrest unit, which delimits the seating area laterally. By an "armrest unit" is herein in particular a unit to be understood which forms a portion or preferably a complete armrest for a seat, in particular a flight passenger seat. The armrest unit herein implements at least one support surface on which a passenger sitting on the flight passenger seat may rest his arm at least partially. For implementing the at least one support surface, the armrest unit herein comprises at least one support element. In this way it is especially simple to create an element on which a passenger may rest his arm at least partially.

It is further proposed that the armrest unit comprises at least one bracing and/or separating element which is oriented substantially perpendicularly to the seat bottom unit, and at least one support element which is pivotably connected thereto. By a "support element" is herein in particular an element to be understood which is preferably implemented of an elastic, dimensionally stable material and comprises at least one surface directly or indirectly forming the support surface. It is conceivable that the support element directly forms the support surface and a passenger comes into contact with the support element directly, or that the armrest unit comprises at least one cushioning element covering the support element and thus forming the support surface, the support element thus forming the support surface indirectly. The support element is herein preferably embodied in such a way that it is adjustable and can be adjusted at least between a rest position and a usage position. Herein the support element is preferentially supported pivotably, and is pivotable between the rest position and the usage position. Principally it is also conceivable that the support element is displaceable between the two positions in another way, e.g. via a linear guidance. By a "bracing and/or separating element" is herein in particular an element to be understood which separates a region, in particular the support surface of the armrest unit, from a support surface of a neighboring flight passenger seat or a further region of the airplane, e.g. an aisle, and provides a bracing surface on which a passenger may brace himself towards a side. By a "bracing surface of the bracing and/or separating element" is herein in particular a surface to be understood that is oriented substantially perpendicularly to the support surface of the support element and faces towards the seating area of the flight passenger seat. By the "support element being pivotable" is herein in particular to be understood that the support element is pivotable via a bearing between at least two positions. By a "rest position of the support element" is herein in particular a position of the support element to be understood in which the support surface of the support element is non-usable for a passenger for resting his arm upon and the support element is arranged at the seating device in a manner that saves as much space as possible. The rest position is implemented as a position in which the passenger does not need the support element and in which the support element is arranged in a manner that is the best possible in regard to space-saving as well as comfort for the passenger. By a "usage position of the support element" is herein in particular a position of the support element to be understood in which the support surface of the support element is usable for the passenger to rest his arm upon, wherein the support element is folded away from the bracing and/or separating element. Via the pivotable support element, a passenger may optionally rest his arm upon the armrest unit or may advantageously fold the support element away for using the thus resulting space in another way.

Beyond this it is proposed that the seating device comprises at least one bracing element, wherein the bracing element spans at least over a region between the seat bottom unit, the armrest unit and/or the backrest unit. By a "bracing element" is herein in particular an element to be understood on which a passenger may brace himself with a portion of his body, in particular with a lower lateral back region. Herein the bracing element is implemented by an element comprising a surface via which a force is introducible into a support structure of the seating device. The bracing element may herein be implemented of different elements. It is herein conceivable that the bracing element is implemented by a cushioning, an aircushion, an elastic plastics material or a cover element, e.g. in particular a textile. Principally it is also conceivable that there is a plurality of bracing elements arranged one beside the other, e.g. a plurality of rubber bands running side by side. Preferably the bracing element is herein embodied as a cover element. By a "cover element" is herein in particular an elastic element to be understood which is spanned in a region by way of fixation at a plurality of its ends. Herein the cover element is preferably implemented of a textile, like in particular a net. Principally it is also conceivable that the cover element is embodied by a thin-walled plastics material, a fiber-composite material or other materials which are deemed expedient by someone skilled in the art. By way of the bracing element advantageously a lateral bracing may be rendered available on which a passenger may brace himself laterally with his back and may take a particularly comfortable position on the flight passenger seat.

It is also proposed that, in a rest position of the support element, the bracing element directly abuts on a bracing surface of the support element. By a "bracing surface of the support element" is herein in particular a surface to be understood which a passenger sitting on the flight passenger seat may lean upon in particular laterally. Herein the bracing surface is in particular embodied in a cushioned fashion. The bracing surface is herein arranged on a side of the support element that is situated opposite the support surface. The bracing surface faces the seating area in the folded-up position. This allows advantageously using the support element in a rest position and thus providing a particularly comfortable flight passenger seat.

Furthermore it is proposed that the backrest unit forms a backrest support surface, which features a tapering in its lower region. By a "backrest support surface" is herein in particular a surface to be understood which is available to the passenger for leaning his back upon. A "lower region" is herein in particular to mean a region of the backrest unit which faces towards the seat bottom unit. The lower region herein occupies approximately the lower third of the backrest support surface. A "tapering" is herein in particular to mean a region featuring different widths over a defined length while becoming increasingly narrower, viewed from a starting point of the tapering. This allows achieving an especially advantageous and comfortable backrest support surface.

Moreover a layout is proposed in which at least two flight passenger seats are arranged one behind the other one, wherein a backrest unit of the frontward flight passenger seat extends in a comfort position until over a seat bottom unit of the rearward flight passenger seat. A "layout" is herein to mean an arrangement of a plurality of flight passenger seats in an airplane cabin. The term "arranged one behind the other one" is herein in particular to mean arranged in a row, one behind the other one, wherein middle axes of the flight passenger seats arranged one behind the other one, which run in parallel to the seating directions of the flight passenger seats, are arranged coaxially with respect to each other. The flight passenger seats arranged one behind the other one are herein oriented in the same direction. Herein the flight passenger seats are arranged in particular with a pitch distance of 33 inches with respect to each other. The pitch distance is herein implemented by a distance of the mounting of two flight passenger seats which are arrange one behind the other one. The pitch distance is herein measured, for example, by measuring the distance between two identical structural components of the two seats which are arranged one behind the other one, e.g. by measuring a distance between a front edge of the seat bottom unit of the frontward flight passenger seat and a front edge of the seat bottom unit of the rearward flight passenger seat. A measuring is herein effected in parallel to the seating direction of the flight passenger seats, preferably in parallel to a longitudinal axis of an airplane cabin. Herein an overlap of the backrest unit of the frontward flight passenger seat until over a seat bottom unit over the rearward flight passenger seat only occurs in the comfort position. In a TTL position of the frontward flight passenger seat there is in particular no overlap of the backrest unit of the frontward flight passenger seat until over a seat bottom unit of the rearward flight passenger seat. In this way a particularly advantageous and space-saving arrangement of flight passenger seats in a layout is achievable.

Furthermore it is proposed that an overlap of the backrest unit of the frontward flight passenger seat with the seat bottom unit of the rearward flight passenger seat is in a comfort position at least 3.5 inches. "At least 3.5 inches" is herein to mean in particular at least 3.5 inches, advantageously at least 4 inches and in an especially advantageous implementation at least 5 inches. The overlap is herein, in particular in case of a 33-inch pitch distance between the flight passenger seats, in particular at least 3.5 inches. Herein the overlap of the backrest unit of the frontward flight passenger seat with the seat bottom unit of the rearward flight passenger seat is in the comfort position at least a fifth, preferably at least a quarter of a length of the seat bottom unit of the rearward flight passenger seat. This allows rendering an especially advantageously compact layout.

The seating device according to the invention is herein not to be restricted to the application and implementation form described above. In particular, the seating device according to the invention may, to fulfill a functionality herein described, comprise a number of respective elements, structural components and units that differs from a number herein mentioned.

DRAWINGS

Further advantages may be gathered from the following description of the drawings. The drawings show two exemplary embodiments of the invention. The drawings, the description and the claims contain a plurality of features in combination. Someone having ordinary skill in the art will purposefully also consider the features separately and will find further expedient combinations.

Figure 2:
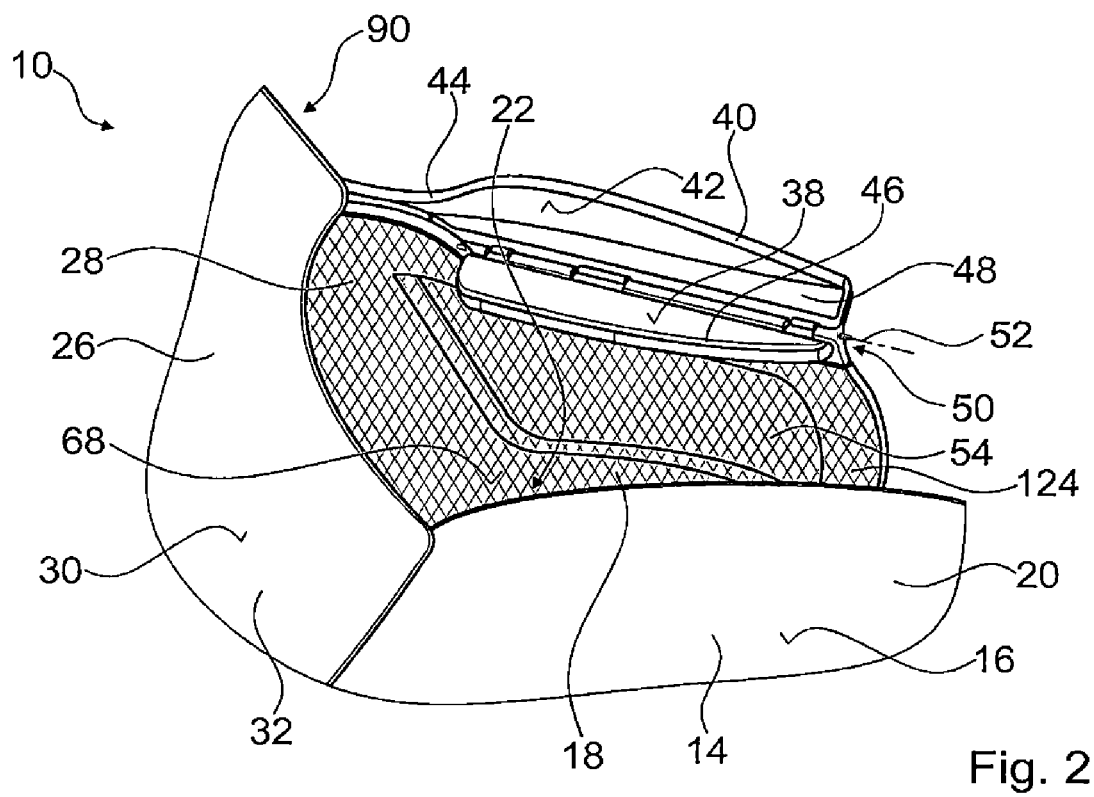
Figure 3:
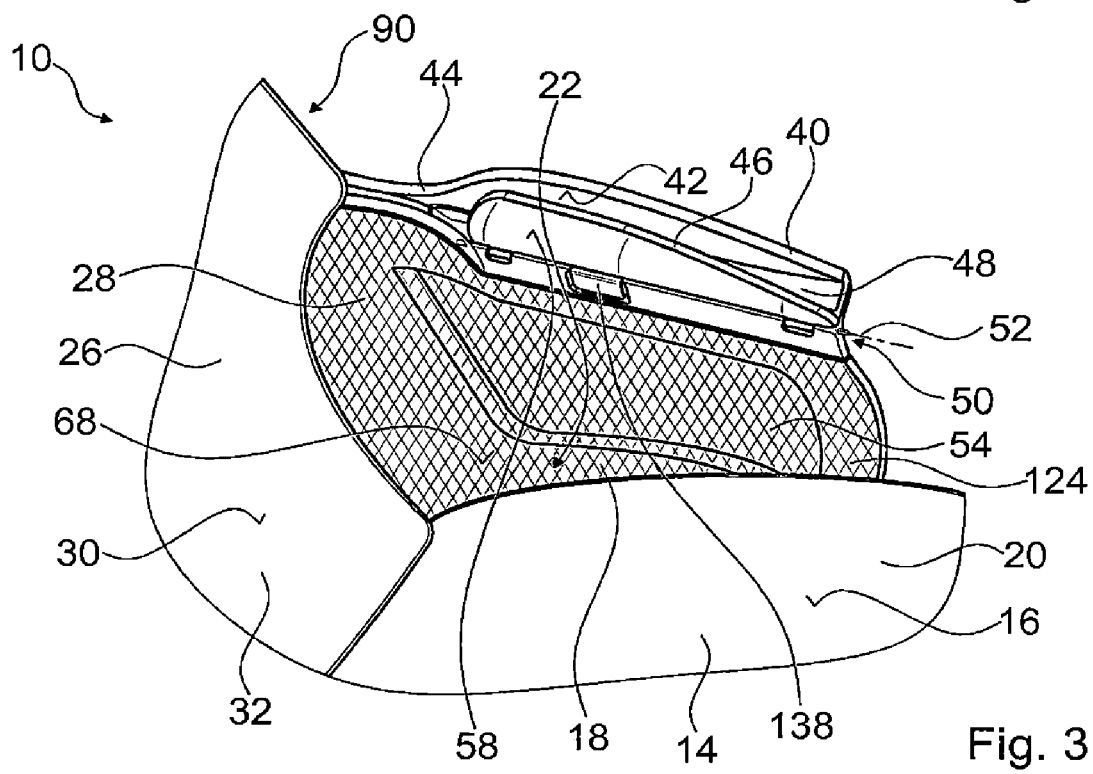
Figure 4:
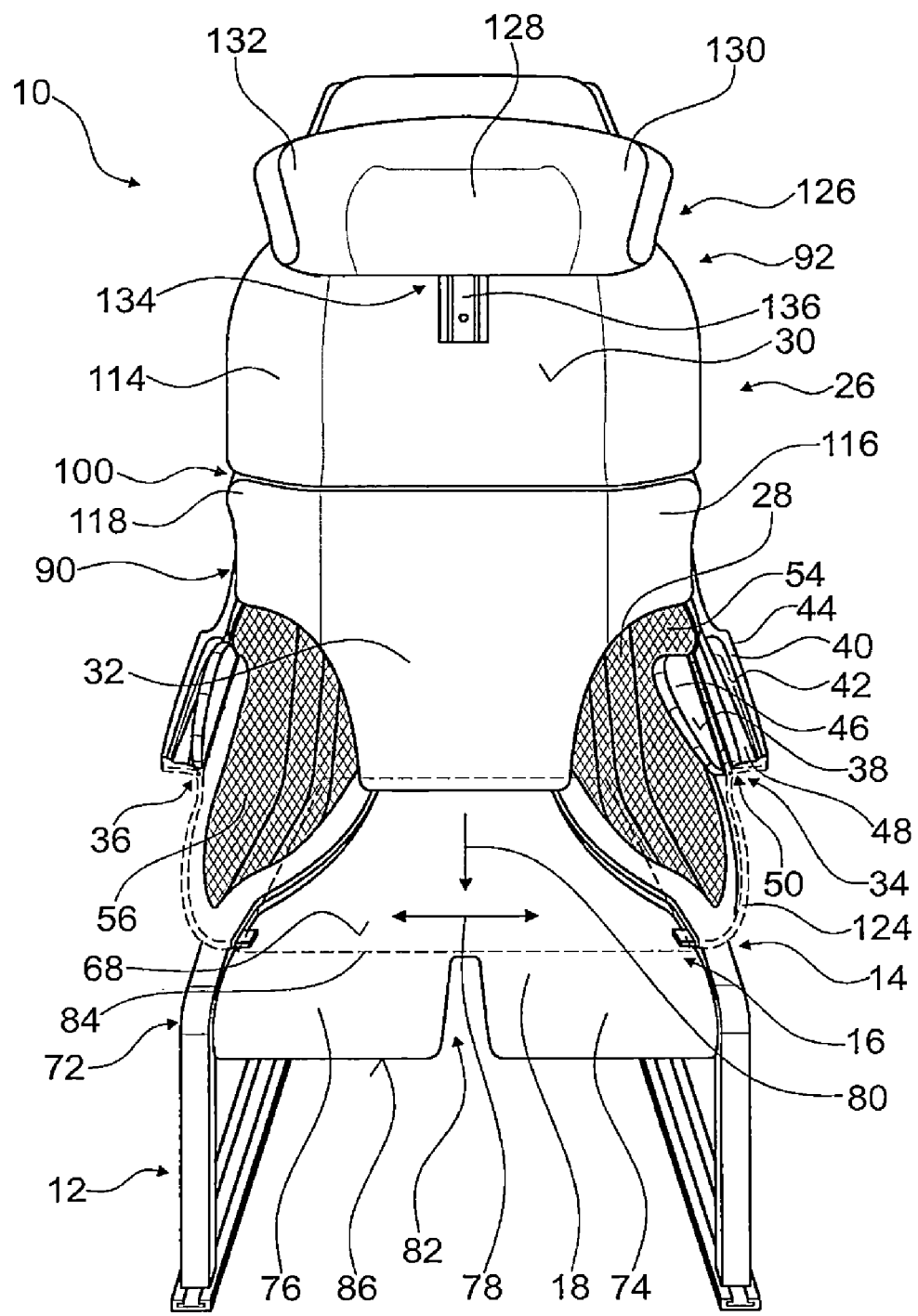
Figure 5:
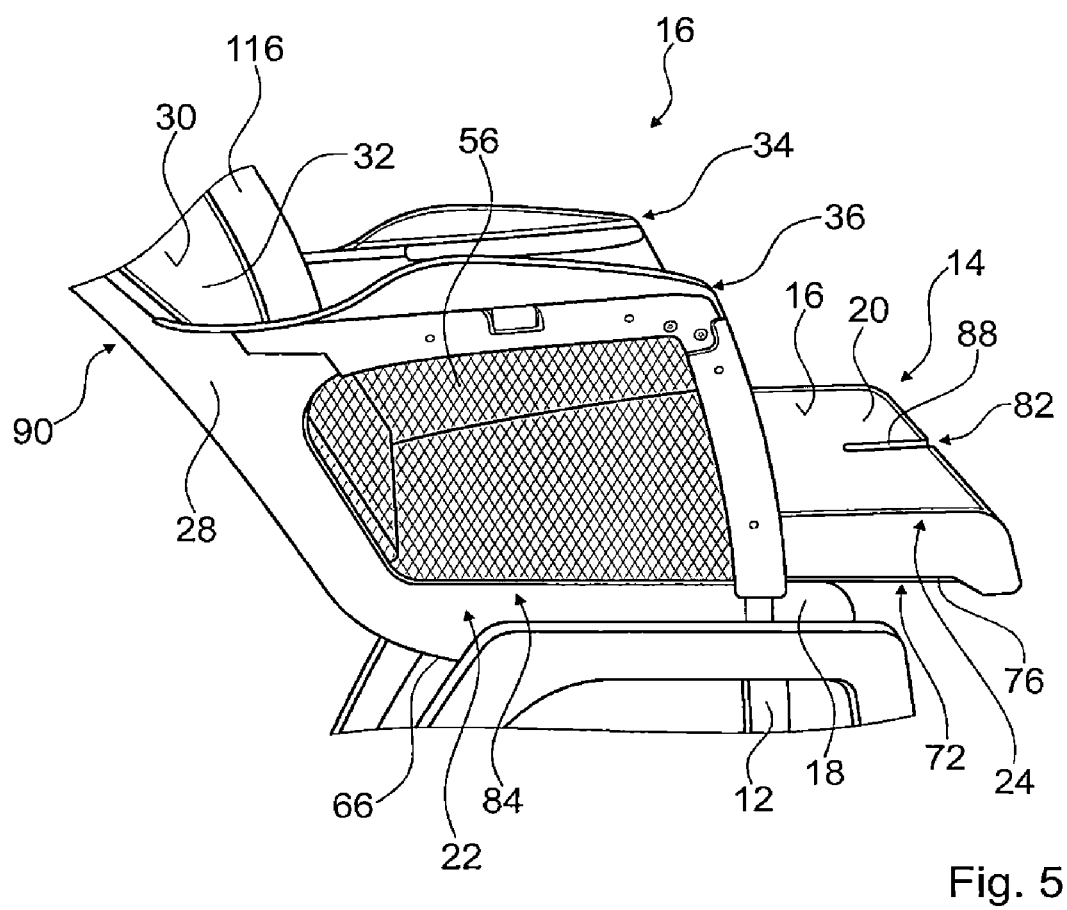
Figure 6:
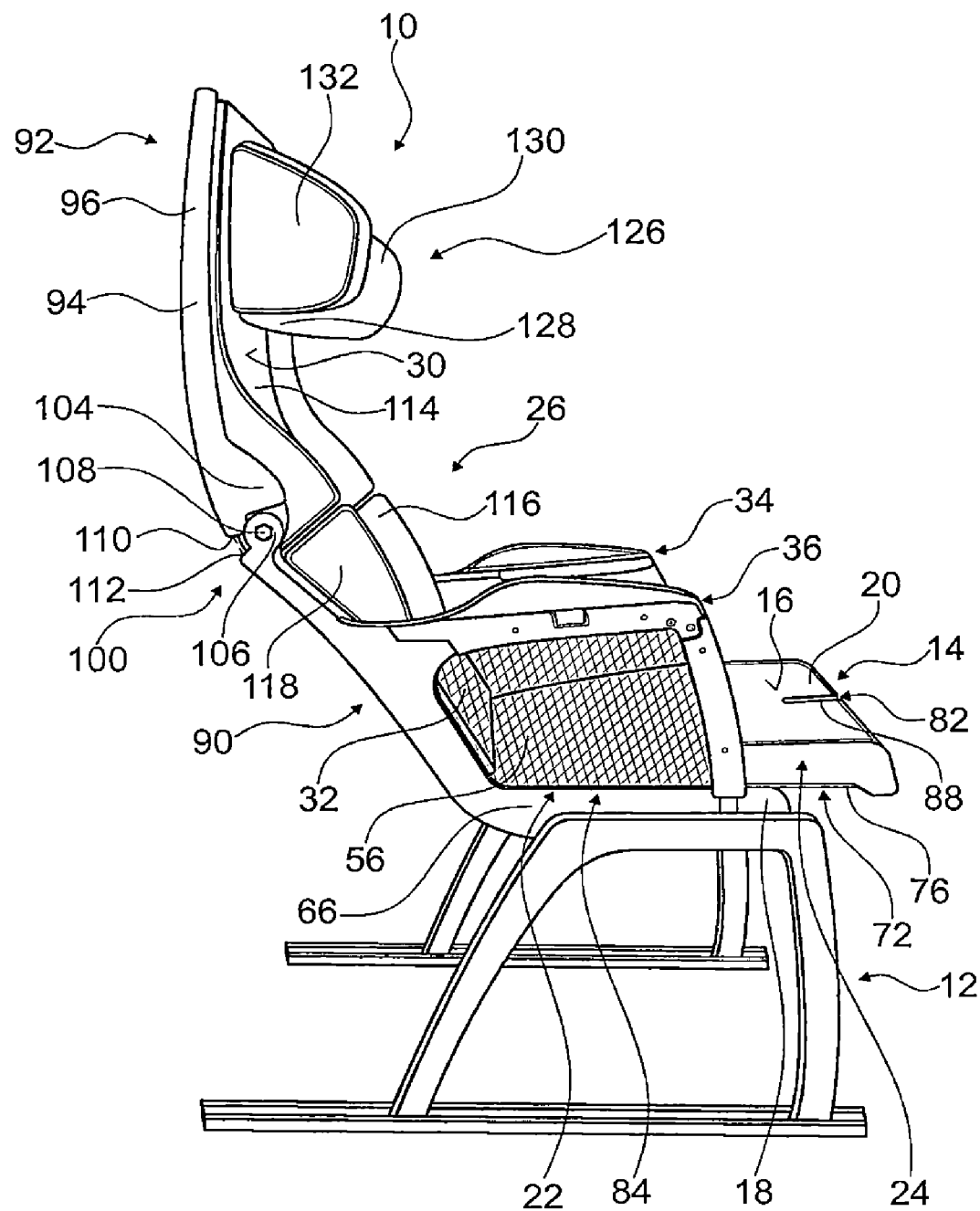
Figure 7:
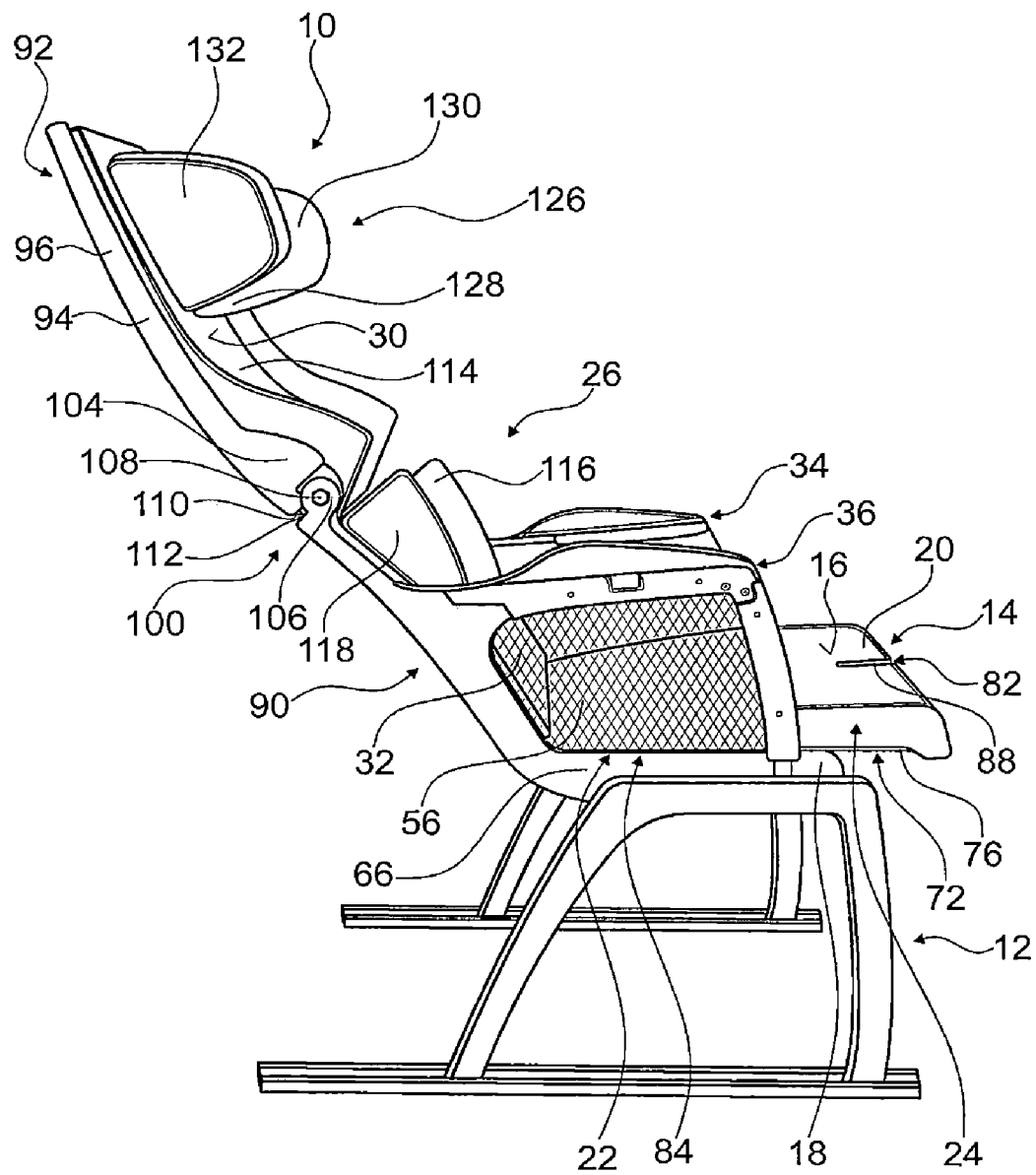
Figure 8:
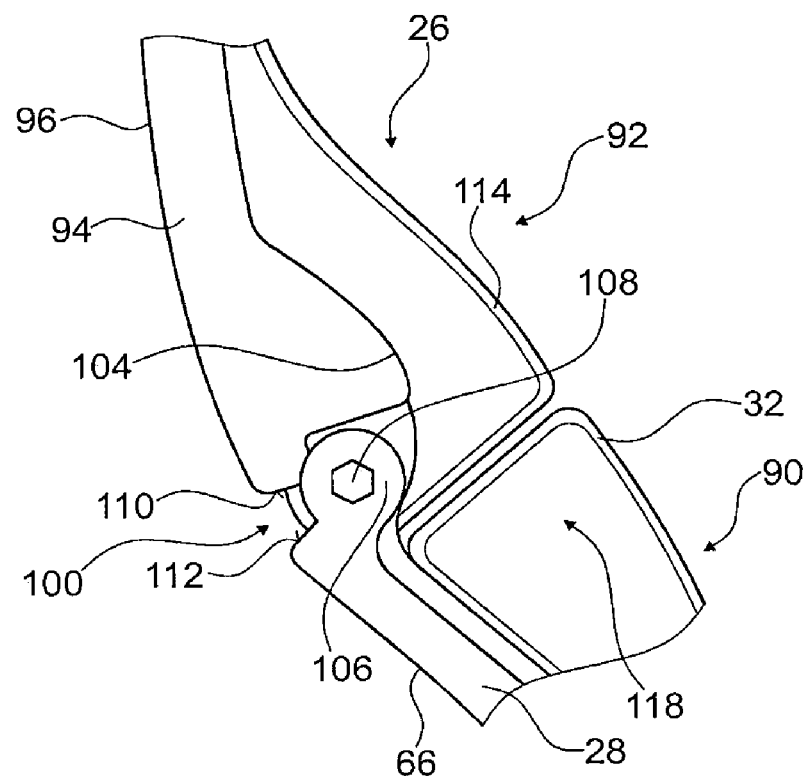
Figure 9:
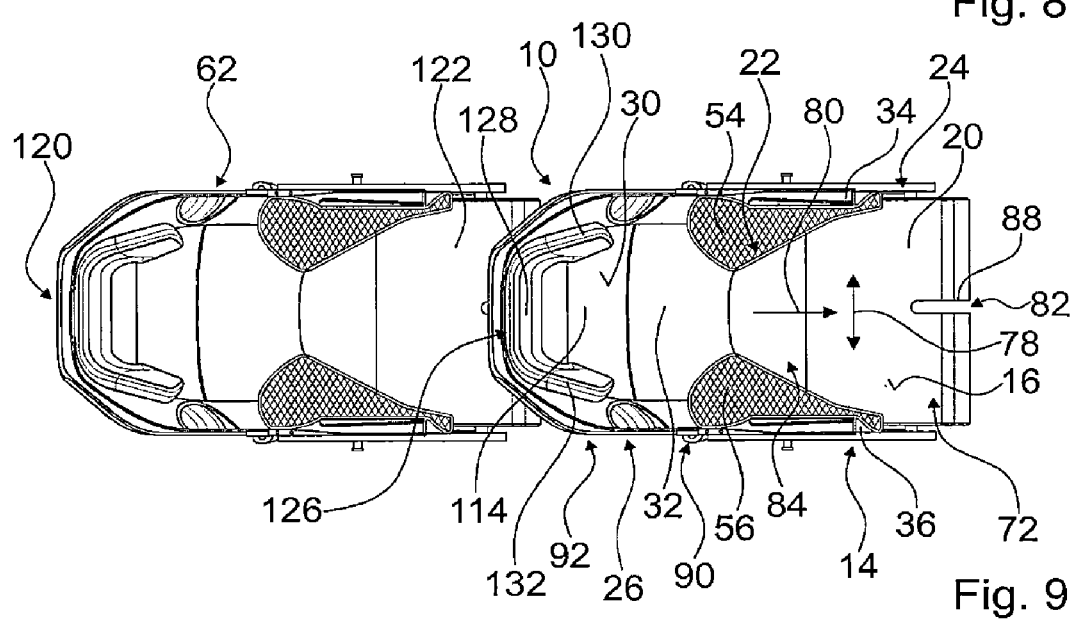
Figure 10:
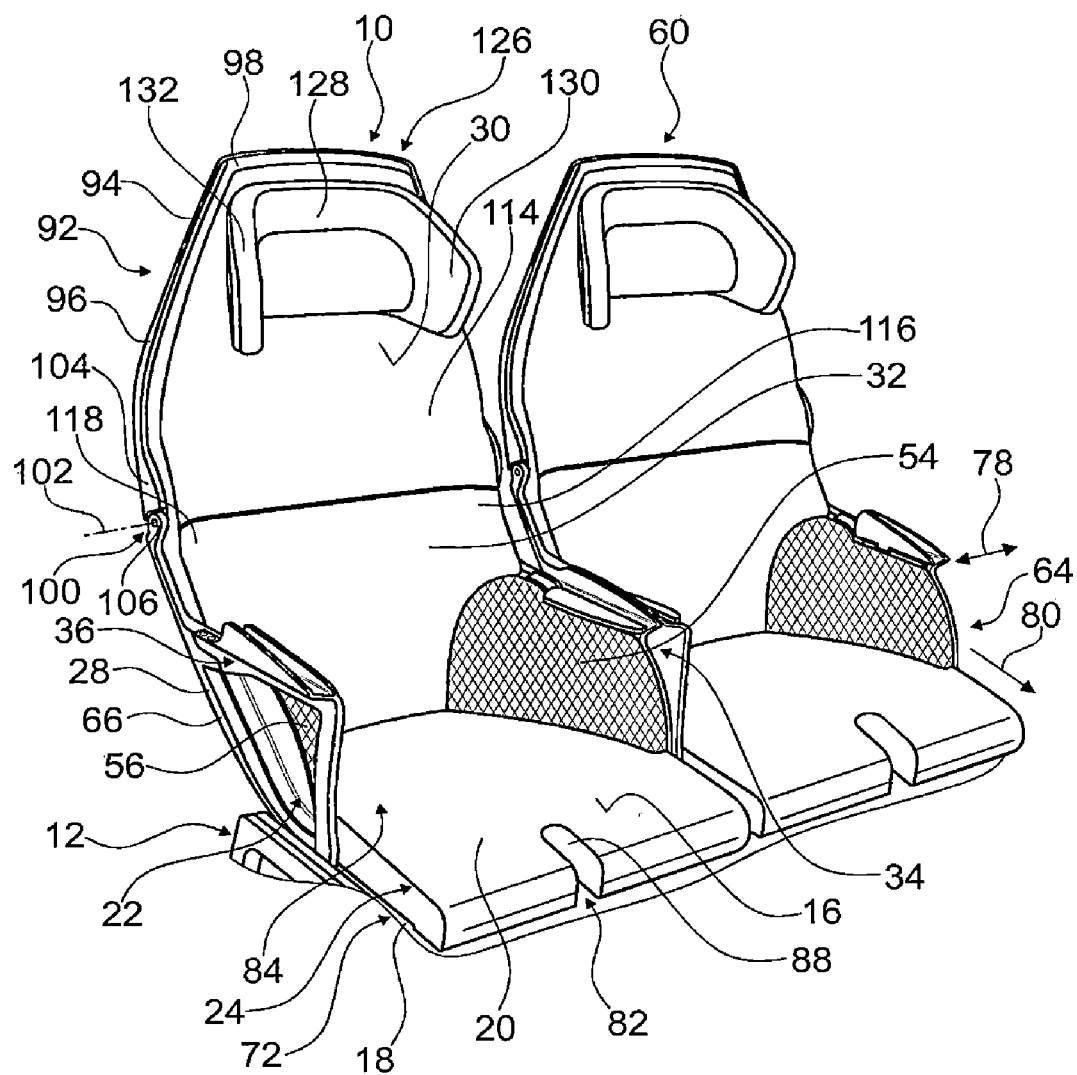
Figure 11:
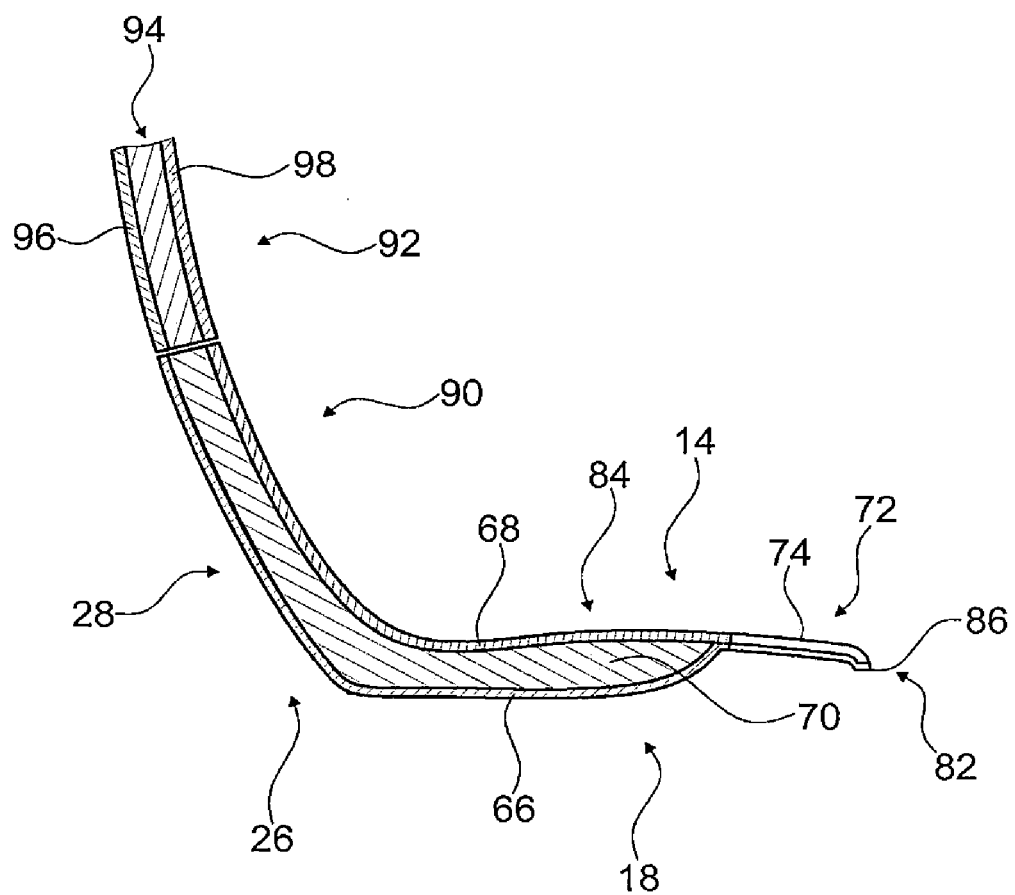
Figure 12:
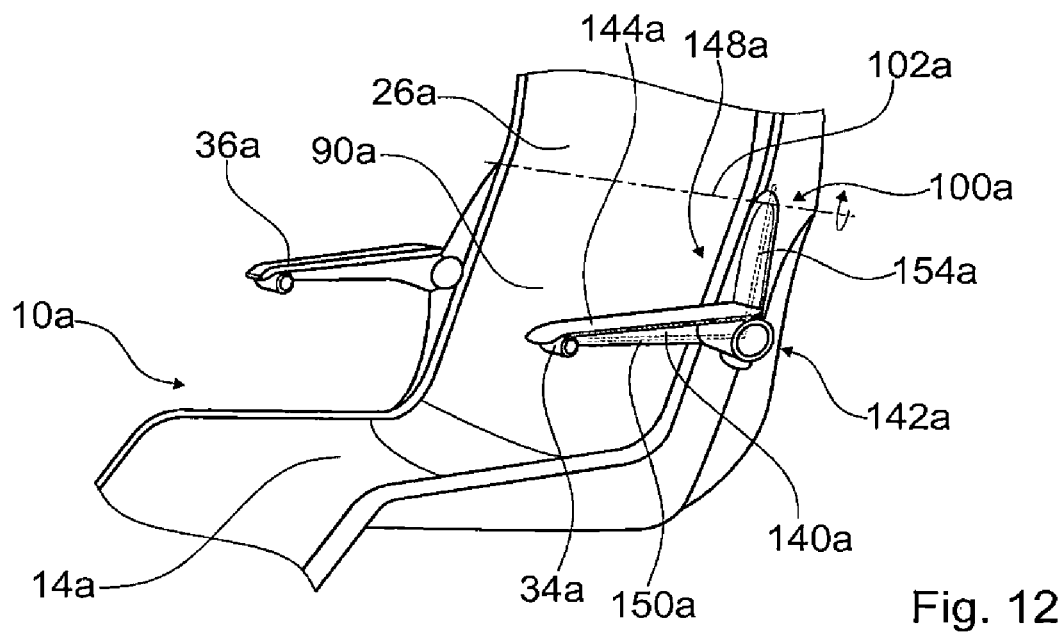
Figure 13:
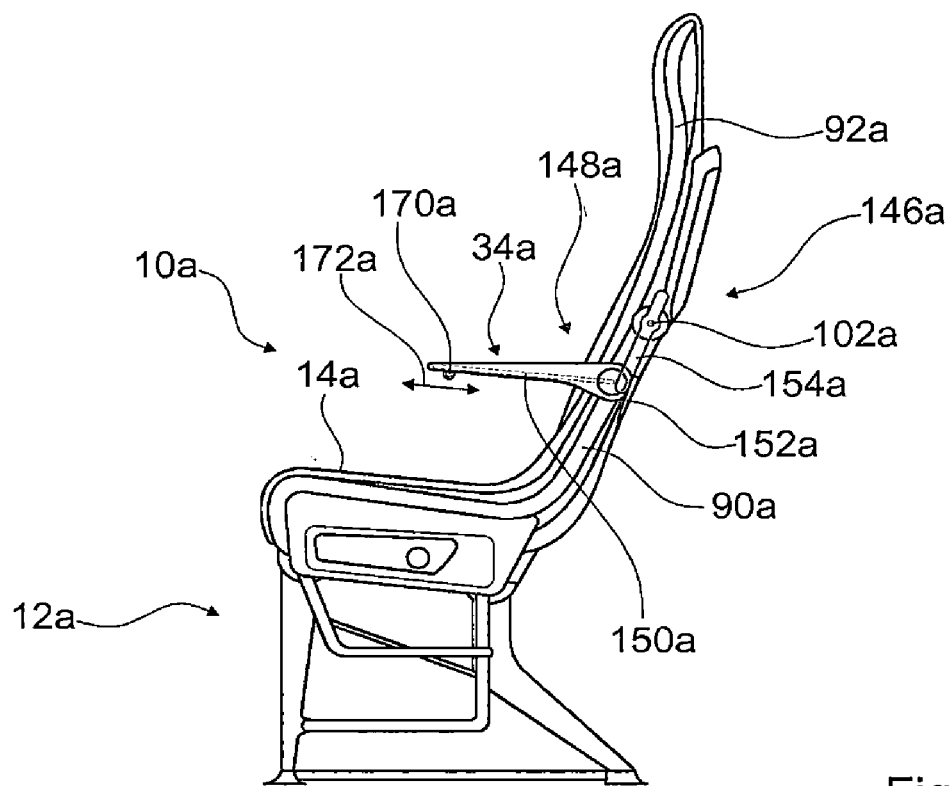
Figure 14:
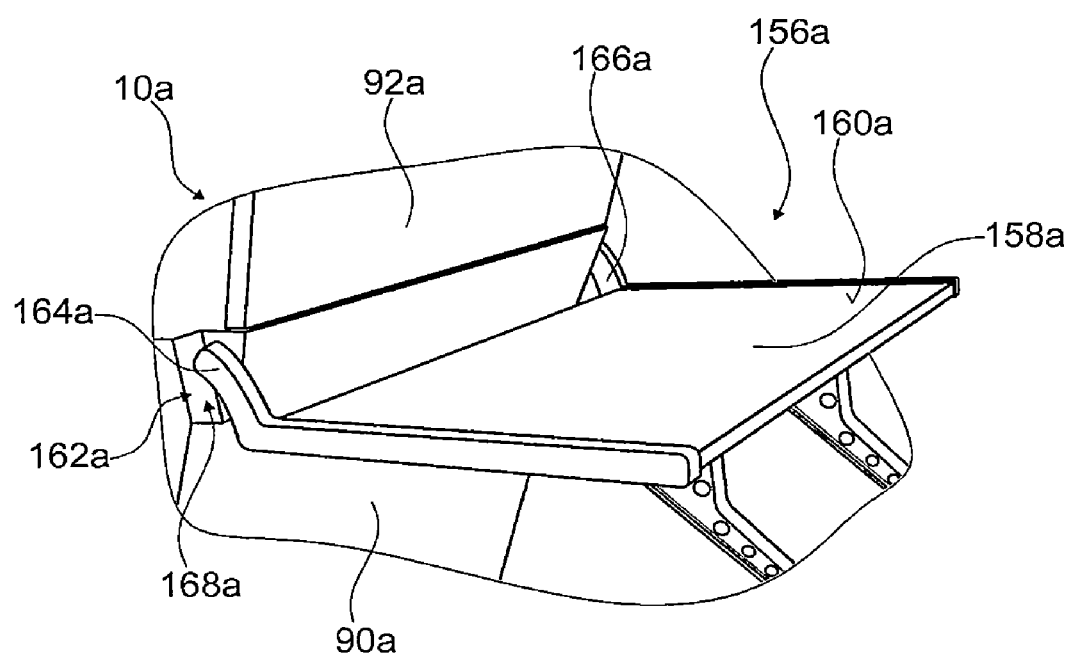

It is shown in:

FIG. 1 a schematic presentation of a flight passenger seat with a seating device according to the invention, in a first exemplary embodiment, FIG. 2 a detailed view of the seating device, with an armrest unit and a bracing element, FIG. 3 another detailed view of the seating device, with an armrest unit and a bracing element, FIG. 4 a schematic view of the flight passenger seat without a cushioning element of a seat bottom unit, FIG. 5 a schematic lateral view of the seating device, FIG. 6 a schematic lateral view of the seat bottom unit in a comfort position embodied as a base position, FIG. 7 a schematic lateral view of the seating device in a TTL position, FIG. 8 a schematic detailed view of a support unit of the backrest device, FIG. 9 a layout according to the invention, with a plurality of flight passenger seats, with the seating device according to the invention, FIG. 10 a schematic presentation of two flight passenger seats arranged side by side in a seat row, with the seating device according to the invention, and FIG. 11 a schematic sectional view of the seating device, FIG. 12 a schematic presentation of a flight passenger seat with a seating device according to the invention, in a second exemplary embodiment, FIG. 13 a schematic presentation of the flight passenger seat, with a slightly indicated locking unit and an actuation unit, and FIG. 14 a schematic presentation of the flight passenger seat from the rear, with a table unit.

DESCRIPTION OF THE EXEMPLARY EMBODIMENTS

FIGS. 1 to 11 show a seating device according to the invention, in a first exemplary embodiment. The seating device is implemented as a flight passenger seating device. The seating device is embodied as a portion of a seat, in particular as a portion of a flight passenger seat 10. The flight passenger seat 10 is in an assembled state mounted in a passenger cabin of an airplane. The passenger cabin comprises a cabin floor which the flight passenger seat 10 is mounted on. The cabin floor implements a mounting plane for the flight passenger seat 10. In the passenger cabin a plurality of flight passenger seats 10, 60, 62, featuring the seating device according to the invention, are arranged. The flight passenger seats 10, 60, 62 are herein arranged in the passenger cabin in a layout which is described in the following. The flight passenger seats 10, 60 are arranged together in a seat row 64 one beside the other one. The seat row 64 is respectively embodied by three flight passenger seats 10, 60 which are arranged one beside the other one, wherein one of them is not shown in detail in the drawings. Principally it would also be conceivable that the seat row 64 comprises a different number of flight passenger seats 10, 60 or that the flight passenger seats 10, 60 are implemented as single seats which are not arranged in a seat row. In the following, only one flight passenger seat 10 is described, with the seating device according to the invention, which is embodied as a flight passenger seating device. The seating device comprises a mounting unit 12. The mounting unit 12 is configured for mounting the flight passenger seat 10 and the further flight passenger seats 60 of a same seat row 64 on the cabin floor. The mounting unit 12 comprises a plurality of connection elements (not shown in detail) fixedly coupling the mounting unit 12 to the cabin floor. Herein the connection elements are preferably configured to be arranged in a fixation rail of the cabin floor in a form-fit fashion and to be fixated in the fixation rail for a fixed connection of the seat row 64.

The seating device comprises a seat bottom unit 14. The seat bottom unit 14 is configured to provide a seating area 16 which a passenger may sit on, in particular during a flight. The seating area 16 forms a seat surface which the passenger sits on. The seat bottom unit 14 is connected to the mounting unit 12. The seat bottom unit 14 is rigidly connected to the mounting unit 12. Principally it is also conceivable that the seat bottom unit 14 is connected to the mounting unit 12 in such a way that it is pivotable via a kinematics mechanism. The seat bottom unit 14 comprises a base body 18. The base body 18 of the seat bottom unit 14 is connected to the mounting unit 12. The base body 18 is embodied at least partly of a fiber-composite material. Principally it is also conceivable that the base body 18 is embodied of a different material, e.g. of a metal.

The base body 18 comprises a front region 72. The front region 72 of the base body 18 herein constitutes approximately one third of the base body 18. The front region 72 is herein arranged, viewed in a seating direction 80, on a front end of the seat bottom unit 14. The front region 72 faces toward a front of the flight passenger seat 10. In the front region 72 the base body 18 comprises two partial regions 74, 76, which are embodied separate from each other in a transverse direction 78. The transverse direction 78 herein extends orthogonally to the seating direction 80 and to a vertical direction. The two partial regions 74, 76, which are embodied separate from each other, are movable with respect to each other in height. The two partial regions 74, 76, which are embodied separate from each other, are movable with respect to each other in the vertical direction. The two partial regions 74, 76 are movable independently from each other. The two partial regions 74, 76, which are separate from each other in the transverse direction 78, are made of a flexible material. Principally it would also be conceivable that the partial regions 74, 76 are made only partly of a flexible material, a remaining portion of the partial regions 74, 76 then being respectively embodied rigidly. The two partial regions 74, 76 have the same dimensions. An extension of the partial region 74 in the seating direction 80 and an extension of the partial region 76 in the seating direction 80 are equal. An extension of the partial region 74 in the transverse direction 78 and an extension of the partial region 76 in the transverse direction 78 are equal.

The base body 18 comprises in its front region 72 a slit 82. The slit 82 separates the two partial regions 74, 76 from each other spatially. The slit 82 is herein arranged centrally, in the transverse direction 78, in the base body 18. The slit 82 has a width of 20 mm. It is principally also conceivable that the slit 82 is implemented narrower or wider than that. The slit 82 extends from a front end 86 of the base body 18 to a rear end of the front region 72. By way of the slit 82 the two partial regions 74, 76 are separate from each other and are mobile independently from each other. It is principally conceivable that between the two partial regions 74, 76 the slit 82 is covered by a safe-guarding element for minimizing injuries. Herein the safe-guarding element is made of a flexible and/or elastic material which does not prevent a mobility of the two partial regions 74, 76 in a mounted state. It is herein conceivable, for example, that the safe-guarding element is made of a thin, elastic textile or plastics material. The safe-guarding element is intended for preventing a passenger from getting squeezed or jammed between the mobile partial regions 74, 76.

The base body 18 comprises a rear region 84. The rear region 84 is embodied more rigid than the front region 72, in which the base body 18 forms the partial regions 74, 76, which are movable with respect to each other. The rear region 84 herein embodies the portion of the base body 18 that is different from the front region 72. The rear region 84 is herein embodied in such a way that it is substantially inelastic. Via the rear region 84 the two partial regions 74, 76, which are embodied separate from each other, are connected to each other. The slit 82, which separates the two partial regions 74, 76 from each other in the front region 72, extends from the front end 86 of the base body 18 up to a transition from the front region 72 to the rear region 84. A rear end of the slit 82 marks the transition between the front region 72 and the rear region 84. The rear region 84 and the at least two partial regions 74, 76, which are embodied movable with respect to each other, are embodied in a one-part implementation with each other. A transition between the rear region 84 and the respective front region 74, 76 is planar.

For a one-part implementation of the rear region 84 and the two partial regions 74, 76, the base body 18 comprises a thin-walled rear wall 66. The thin-walled rear wall 66 is embodied as a lower wall of the base body 18. The thin-walled rear wall 66 is made of a fiber-composite material. Herein the rear wall 66 is made of a molded CFK plate. Principally it is also conceivable that the thin-walled rear wall 66 is made of a different fiber-composite material that is deemed expedient by someone skilled in the art. The thin-walled rear wall 66 herein has a thickness of approximately 2 mm. The thin-walled rear wall 66 finishes the base body 18, and thus the seat bottom unit 14, downwards. The thin-walled rear wall 66 of the base body 18 herein faces towards the mounting unit 12, which is arranged underneath the seat bottom unit 14. The thin-walled rear wall 66 of the base body 18 comprises a connection region (not shown in detail), via which the base body 18, and thus the seat bottom unit 14, are connected to the mounting unit 12.

For a one-part implementation of the rear region 84 and the two partial regions 74, 76, the base body 18 further comprises a thin-walled front wall 68. The thin-walled front wall 68 is embodied as an upper wall of the base body 18. The thin-walled front wall 68 is connected to the thin-walled rear wall 66 of the base body 18. The thin-walled front wall 68 is made of a fiber-composite material. The thin-walled front wall 68 is herein made of a same material as the thin-walled rear wall 66. The thin-walled front wall 68 herein has a thickness of approximately 2 mm. The thin-walled front wall 68 is arranged on an upper side of the base body 18. The thin-walled front wall 68 is oriented upwards. The thin-walled front wall 68 of the base body 18 forms the seating area 16.

The base body 18 comprises a stiffening element 70. The stiffening element 70 is configured for stiffening the base body 18 and thus for stiffening the seat bottom unit 14. For this purpose the stiffening element 70 is arranged between the thin-walled rear wall 66 and the thin-walled front wall 68 of the base body 18. The thin-walled rear wall 66 and the thin-walled front wall 68 enclose the stiffening element 70. The thin-walled rear wall 66 and the thin-walled front wall 68 are connected to each other, in the regions in which they are arranged spaced apart from each other, via the stiffening element 70. The stiffening element 70 is glued with the thin-walled rear wall 66. The stiffening element 70 is glued with the thin-walled front wall 68. The stiffening element 70 is embodied as a foam core.

The thin-walled rear wall 66 and the thin-walled front wall 68 of the base body 18 are connected to each other. The thin-walled front wall 68 and the thin-walled rear wall 66 herein comprise, in a circumferential outer stripe, a respective connection region in which the thin-walled front wall 68 and the thin-walled rear wall 66 are connected to each other. Herein the thin-walled front wall 68 and the thin-walled rear wall 66 are connected to each other by substance-to-substance bond. The thin-walled front wall 68 and the thin-walled rear wall 66, each of which is made of a fiber-composite material, are herein preferably connected in a manufacturing process, in particular a laminating process. Principally it is also conceivable that the thin-walled front wall 68 and the thin-walled rear wall 66 are subsequently connected to each other fixedly in their connection regions via a suitable form-fit and/or force-fit connection and/or via substance-to-substance bond. It would herein be conceivable, for example, that the thin-walled front wall 68 and the thin-walled rear wall 66 are connected to each other in their connection regions via adhesive bonding. Principally it would also be conceivable that the thin-walled front wall 68 and the thin-walled rear wall 66 are connected to each other in their connection regions via suitable form-fit elements, e.g. latching elements. In the same way, it would principally be conceivable that the thin-walled front wall 68 and the thin-walled rear wall 66 are connected to each other in their connection regions via additional lateral parts, which are optionally glued with the thin-walled front wall 68 and the thin-walled rear wall 66 subsequently, or which are already, from the start, laminated with the thin-walled front wall 68 and the thin-walled rear wall 66.

In the rear region 84, apart from the connection regions, in which the thin-walled front wall 68 and the thin-walled rear wall 66 are connected to each other, thus merging into each other, the thin-walled front wall 68 and the thin-walled rear wall 66 are arranged spaced apart from each other. As a result of this, the thin-walled front wall 68 and the thin-walled rear wall 66 form an interstice in the rear region 84. In the interstice spanned in the rear region 84 by the thin-walled front wall 68 and the thin-walled rear wall 66, the stiffening element 70 is arranged, which is embodied as a foam core. The rear region 84 is stiffened by means of the stiffening element 70. In the two partial regions 74, 76, the thin-walled front wall 68 and the thin-walled rear wall 66 are connected to each other directly and over surfaces. The base body 18 comprises only the thin-walled front wall 68 and the thin-walled rear wall 66 in the two partial regions 74, 76. As in the partial regions 74, 76 only the thin-walled front wall 68 and the thin-walled rear wall 66 are connected to each other without enclosing a stiffening element, the partial regions 74, 76 are implemented in such a way that they are significantly more flexible than the rear region 84. The partial regions 74, 76 have a base position, in which both feature a same orientation regarding the rear region 84. The base position constitutes an un-deflected position of the partial regions 74, 76, in which essentially no exterior force, in particular no force caused by a passenger sitting on the flight passenger seat 10, acts upon the partial regions 74, 76. In the base position the partial regions 74, 76 are oriented approximately in parallel to the rear region 84. If the partial regions 74, 76 are deflected by an exterior force, e.g. by a force caused by a passenger sitting on the flight passenger seat 10, an interior tension, which implements a reset force, is generated in the partial regions 74, 76 by an elastic deformation of the partial regions 74, 76. On a cessation of the force that has resulted in the deflection, the partial regions 74, 76 are reset into their respective base positions via the reset force. The reset force generated in an adjustment induces a counterforce acting counter to the force that has effected the adjustment. By setting a stiffness of the partial regions 74, 76 via a variation of a thickness of the thin-walled front wall 68 or of the thin-walled rear wall 66, or by inserting a stiffening element, an adjustment range and a yieldingness of the partial regions 74, 76 may be set. Via the partial regions 74, 76, which move out of their rest positions differently from each other, the seating area 16 may advantageously adapt to a sitting position of a passenger sitting on the flight passenger seat 10. Depending on the passenger distributing his weight, in particular in the front region 72, the partial regions 74, 76 yield by different amounts. Due to this, in a situation in which the passenger leans on a side of the flight passenger seat 10, the partial region 74, 76, which is arranged on the respective side of the flight passenger seat 10, may advantageously yield further, relieving a load onto the body portion lying upon the respective partial region 74, 76, e.g. a thigh. This allows a passenger taking an especially comfortable position. In particular in case of side sleep, in which a weight of the passenger is arranged one-sidedly on the seat bottom unit 14, the seat bottom may be implemented in an advantageously comfortable manner due to the yielding partial regions 74, 76.

The seat bottom unit 14 comprises a cushioning element 20. The cushioning element 20 is fixedly connected to the base body 18 of the seat bottom unit 14. The cushioning element 20 is made of a foam material. Principally it is also conceivable that the cushioning element 20 is made of a different material deemed expedient by someone skilled in the art, which is at least partly elastic. The cushioning element 20 is herein covered by a cover (not shown in detail), which is removably connected to the cushioning element 20. For the purpose of replacement, the cover is easily removable from the cushioning element 20. It is herein also conceivable that the cover is pulled over the cushioning element 20 as well as partly over the base body 18. For the further description of the cushioning element 20 the cover is to be understood to be described implicitly. The cushioning element 20 implements the seating area 16 of the seat bottom unit 14. The seating area 16 comprises a rear region 22 and a front region 24. The front region 24 of the seating area 16 is arranged on an end of the seat bottom unit 14 which is a front end when viewed in the seating direction 80 of the flight passenger seat 10. The rear region 22 of the seat bottom unit 14 is arranged on an end of the seat bottom unit 14 which is a rear end when viewed in the seating direction 80. The seating area 16 forms a tapering in the rear region 22. The cushioning element 20 is embodied in such a way that it is narrower in the rear region 22 than in the front region 24. A seating surface implemented by the seating area 16 is embodied in such a way that it is narrower in the rear region 22 than in the front region 24. A width of the seating area 16 is 450 mm in the front region 24. Principally it is conceivable that the width of the seating area 16 is between 400 mm and 600 mm in the front region 24. A minimum width of the seating area 16 in the rear region 22 is 250 mm. Principally it is conceivable that in the rear region 22 the width of the seating area 16 is between 200 mm and 450 mm. The minimum width of the seating area 16 is in the front region 24 greater than the minimum width of the seating area 16 in the rear region 22 by at least 30%. In this the width of the rear region 22 of the seating area 16 steadily decreases in a direction counter to the seating direction 80. A decrease of the width of the rear region 22 is herein not continuous. Principally, it is however also conceivable that the decrease of the width of the rear region 22 has a steady course. The rear region 22 of the seating area 16 approximately implements the rear third of the seating area 16. The cushioning element 20 features on its front end a slit 88 extending, in a mounted state, congruent with the slit 82 of the base body 18. As a result of this, the cushioning element 20 also comprises in its front region two partial regions 74, 76, which are separate from each other and are movable independently from each other. Principally, however, it is also conceivable that the cushioning element 20 does not comprise a slit 88 and forms a continuous front end.

The seating device comprises a backrest unit 26. The backrest unit 26 is configured for the purpose of allowing a passenger sitting on the flight passenger seat 10 to rest his back against it. The backrest unit 26 is mounted at the rear end of the seat bottom unit 14. The backrest unit 26 delimits the seating area 16 to the rear. The backrest unit 26 is rigidly connected to the seat bottom unit 14. Principally it is also conceivable that the backrest unit 26 and the seat bottom unit 14 are connected to each other in such a way that they are pivotable via a kinematics mechanism.

The backrest unit 26 comprises a rigid partial region 90. The rigid partial region 90 is embodied as a lower region of the backrest unit 26. The rigid lower partial region 90 faces towards the seat bottom unit 14. The lower partial region 90 of the backrest unit 26 implements a first base body 28 of the backrest unit 26. The base body 28 of the backrest unit 26 herein partially forms a supporting structure of the backrest unit 26. The first base body 28 of the backrest unit 26 is embodied in a one-part implementation with the base body 18 of the seat bottom unit 14. Herein the base body 28 of the rigid lower partial region 90 is embodied by the thin-walled rear wall 66, the thin-walled front wall 68 and the stiffening element 70, which is arranged between the thin-walled rear wall 66 and the thin-walled front wall 68. The thin-walled front wall 68 herein extends upwards, in a region of the lower partial region 90 of the backrest unit 26 on a front side of the backrest unit 26, from the seat bottom unit 14. In a region of the lower partial region 90 of the backrest unit 26 on a rear side of the backrest unit 26, the thin-walled rear wall 66 points from the seat bottom unit 14 upwards. Between the backrest unit 26 and the seat bottom unit 14, transitions of the thin-walled front wall 68 and the thin-walled rear wall 66 are respectively implemented by radii. Due to the one-part implementation of the base bodies 18, 28 of the seat bottom unit 14, respectively of the lower partial region 90 of the backrest unit 26, the seat bottom unit 14 and the lower partial region 90 of the backrest unit 26 are rigidly connected to each other. The seat bottom unit 14 and the lower partial region 90 of the backrest unit 26 include a fixed, non-modifiable angle with each other. By the angle included by the seat bottom unit 14 and the lower partial region 90 of the backrest unit 26, a sitting angle is defined which is included by the backrest unit 26 and the seat bottom unit 14 in a base position. Herein the sitting angle included by the backrest unit 26 and the seat bottom unit 14 is 130 degrees.

Principally it would also be conceivable that the base body 28, which forms the lower partial region 90 of the backrest unit 26, is embodied separately from the base body 18 of the seat bottom unit 14. Herein it would be conceivable that the base body 28 of the backrest unit 26 is also built in a sandwich structure and is composed of a thin-walled front wall, a thin-walled rear wall and a stiffening element. The first base body 28 of the backrest unit 26, which is embodied separately from the base body 18 of the seat bottom unit 14, would then, during assembly, be connected fixedly and rigidly to the base body 18 of the seat bottom unit 14 via a type of connection that is deemed expedient by someone skilled in the art, e.g. a screw connection. In such an implementation of the base bodies 18, 28 a pivotable connection of the base bodies 18, 28 would also be conceivable. Principally it is also conceivable that the base body 28 is implemented of a different material deemed expedient by someone skilled in the art, e.g. a metal.

The backrest unit 26 comprises an upper partial region 92. The upper partial region 92 is embodied in such a way that it is pivotable with respect to the lower partial region 90. The backrest unit 26 comprises a second base body 94, which implements the upper partial region 92. The base body 94 is herein embodied substantially of a fiber-composite material. The base body 94 is implemented in a sandwich structure. Herein the base body 94 comprises a thin-walled rear wall 96, a thin-walled front wall 98 and a stiffening element enclosed therein, which is not shown in detail. A construction of the base body 94 is herein approximately equivalent to the construction of the base body 18 of the seat bottom unit 14. Principally it is also conceivable that the base body 94 is embodied of a different material deemed expedient by someone skilled in the art, e.g. a metal.

The backrest unit 26 comprises a support unit 100. Via the support unit 100, the lower partial region 90 and the upper partial region 92 are pivotable with respect to each other. The support unit 100 pivotably connects the first base body 28 of the backrest unit 26, which forms the lower partial region 90, to the second base body 94 of the backrest unit 26. Herein the support unit features a maximum pivoting range of approximately 35 degrees, by which the lower partial region 90 and the upper partial region 92 are pivotable with respect to each other. Principally, a pivoting range of 40 to 50 degrees is also feasible. The support unit 100, which supports the rigid lower partial region 90 with the pivotable upper region 92, comprises a pivot axis 102. The pivot axis 102 is offset with respect to a rear end of the backrest unit 26 in the seating direction 80 frontwards. Viewed in the seating direction 80, the pivot axis 102 is arranged to the front of the thin-walled rear wall 96, respectively the thin-walled rear wall 66. Viewed in the seating direction, the pivot axis 102 is arranged to the front of the thin-walled front wall 68, 98, respectively of the thin-walled rear wall 66, 96.

To implement the support unit 100, the first base body 28 and the second base body 94 respectively form in their peripheral regions, on sides facing each other, an elevation 104, 106 extending in the seating direction 80. In the region of the support unit 100, in which the base bodies 28, 94 form the elevations 104, 106, the two base bodies 28, 94 overlap. The base bodies 28, 94 respectively form bearing accommodations (not shown in detail) in the elevations 104, 106. The bearing accommodations are connected to each other via a support element 108. The support element 108 is herein embodied as a support bolt. Principally it is also conceivable that the support element 108 is embodied as a different support element deemed expedient by someone skilled in the art. Via the support element 108 the base body 28 and the base body 94 are pivotable with respect to each other. Principally it is also conceivable that the support unit 100 is embodied in a different manner deemed expedient by someone skilled in the art. The support unit 100 comprises a plurality of stop elements 110, 112 delimiting the lower partial region 90 and the upper partial region 92 to their maximum positions with respect to each other. A stop element 110 is herein formed by the base body 94, which implements the upper partial region 92. The stop element 112 is formed by the base body 28, which implements the lower partial region 90. In a comfort position, which is implemented as a base position, the two stop elements 110, 112 abut on each other, thus fixating the lower partial region 90 and the upper partial region 92 of the backrest unit 26 with respect to each other. The support unit 100 comprises further stop elements (not shown in detail), which contact each other in a TTL position of the backrest unit 26, thus fixating the lower partial region 90 and the upper partial region 92 of the backrest unit 26 with respect to each other in the TTL position.

The backrest unit 26 implements a backrest support surface 30. For implementing the backrest support surface 30, the backrest unit 26 comprises a first cushioning element 32 and a second cushioning element 114. The first cushioning element 32 is mounted on a front side of the first base body 28 of the backrest unit 26. The first cushioning element 32 forms the backrest support surface 30 in the lower partial region 90 of the backrest unit 26. For the purpose of connecting the cushioning element 32 to the base body 28, the backrest unit 26 comprises a plurality of connection elements (not shown in detail), which are integrated correspondingly in the base body 28 and in the cushioning element 32. The connection elements are herein embodied as loop-and-hook bands. Principally it is also conceivable that the connection elements, which are not shown in detail, are embodied as form-fit and/or force-fit elements in any other manner deemed expedient by someone skilled in the art, e.g. as fastener buttons. The cushioning element 32 is made of an elastic material, like in particular a foamed plastics material. Principally it is also conceivable that the cushioning element 32 is embodied of a different elastic synthetic and/or natural material that is deemed expedient by someone skilled in the art. The cushioning element 32 implements on its front side, which faces away from the base body 28, the backrest support surface 30. Herein the cushioning element 32 comprises a cover (neither shown nor designated in detail), which finishes the cushioning element 32 on the backrest support surface 30. The cover is herein removable from the cushioning element 32 and may be separated from the cushioning element 32 for cleaning or replacement purposes. The second cushioning element 114 is mounted on a front side of the second base body 94 of the backrest unit 26. The second cushioning element 114 implements the backrest support surface 30 in the upper partial region 92 of the backrest unit 26. For connecting the second cushioning element 114 to the base body 94, the backrest unit 26 comprises a plurality of connection elements (not shown in detail), which are integrated correspondingly in the base body 94 and the cushioning element 114. The connection elements are herein embodied as loop-and-hook bands. The backrest support surface 30 comprises a lower region formed by the cushioning element 32. The lower region of the backrest support surface 30 is arranged on a side of the backrest unit 26 that faces towards the seat bottom unit 14. In a mounted state, the lower region of the backrest support surface 30 faces towards the cabin floor. The backrest support surface 30 comprises an upper region formed by the cushioning element 114. The upper region of the backrest support surface 30 is arranged on a side of the backrest unit 26 which faces away from the seat bottom unit 14. In a mounted state, the upper region of the backrest support surface 30 faces away from the cabin floor. The backrest support surface 30 features a tapering at its lower end. The backrest support surface 30 is in its lower region narrower than in its upper region. The lower region of the backrest support surface 30 features a width that is smaller than a width of the backrest support surface 30 in the upper region by more than 50%. A transition between the wide upper region of the backrest support surface 30 and the narrow lower region of the backrest support surface 30 is implemented by a radius. The tapering of the backrest support surface 30 increases in the lower region from a transition from the upper region to a lower end of the backrest support surface 30. The lower region, which implements the tapering of the backrest support surface 30, is in its upper end, which faces towards the upper region, wider than in its lower end, which faces away from the upper region. Principally it is also conceivable that the tapering features a same width over its entire length.

The backrest unit 26 implements, laterally in a region of the support unit 100, stop elements 116, 118 each extending frontwards. The stop elements 116, 118 are configured to allow a passenger sitting on the flight passenger seat 10 leaning on the stop elements 116, 118 sideways. The stop elements 116, 118 herein respectively extend from a lower region of the upper partial region 92 of the backrest unit 26 into an upper region of the lower partial region 90 of the backrest unit 26. The stop elements 116, 118 herein rise steadily from the backrest support surface 30 in a radius until they have their maximum extension approximately in a region of the support unit 100, and then lower themselves in a radius steadily down to the backrest support surface 30. Upper partial regions of the stop elements 116, 118 are herein formed by the cushioning element 114, which is arranged on the base body 94 of the upper partial region 92 of the backrest unit 26. Lower partial regions of the stop elements 116, 118 are herein formed by the cushioning element 32, which is arranged on the base body 28 of the lower partial region 90 of the backrest unit 26.

The backrest unit 26 comprises a headrest 126. The headrest 126 is arranged on an upper end of the upper partial region 92 of the backrest unit 26. The headrest 126 comprises a headrest element 128. The headrest element 128 is embodied as a cushioned element. The headrest element 128 forms on each of its two lateral ends a bracing element 130, 132 protruding to the front and respectively providing a lateral bracing surface for the passenger's head. This allows the passenger comfortably supporting his head sideways on the headrest 126, which makes the headrest 126 particularly suitable for a side sleep. It is herein conceivable that the bracing elements 130, 132 are adjustable at an angle to the headrest element 128. The headrest 126 is herein adjustable in a height with respect to the backrest unit 26. For this purpose the headrest 126 comprises a linear guidance 134. The headrest element 128 is adjustable in a height with respect to the backrest unit 26 via the linear guidance 134. For this purpose the linear guidance 134 comprises a guiding rail 136, which is fixedly connected to the backrest unit 26. The headrest element 128 comprises a guiding element (not shown in detail), which is embodied correspondingly to the guiding rail 136 and is guided in the guiding rail 136. A movement of the guiding element with respect to the guiding rail 136 is embodied self-blocking. For a displacement of the headrest element 128 on the guiding rail 136, a force must be exerted along a displacement axis of the guiding rail 136, which is greater than a force exerted onto the headrest element 128 in operation by a head resting on the headrest element 128. In this way an inadvertent adjustment of the headrest element 128 is prevented. Principally it is also conceivable that the headrest 126 comprises a locking mechanism which locks the headrest 126 in the different positions, wherein a passenger has to effect unlocking manually, e.g. by a push button.

The seating device further comprises a first armrest unit 34. Furthermore the seating device comprises a second armrest unit 36. The two armrest units 34, 36 are configured to delimit the seating area 16 laterally. The armrest units 34, 36 respectively delimit the seating area 16 on two opposite sides of the seat bottom unit 14. The armrest units 34, 36 delimit the seating area 16 in a direction that is orthogonal to a seating direction 80 of the flight passenger seat 10. The armrest units 34, 36 are implemented equivalently to each other. The first armrest unit 34 and the second armrest unit 36 are embodied mirror-symmetrically. Therefore only the first armrest unit 34 is described in detail below, the description being transferable to the second armrest unit 36, which is embodied mirror-symmetrically identically.

The armrest unit 34 is configured to provide a support surface 38 for a passenger sitting on the flight passenger seat 10. The support surface 38 is configured to allow a passenger resting his arm and/or his hand thereon at least partially. The armrest unit 34 comprises a bracing and/or separating element 40. The bracing and/or separating element 40 is configured to provide a bracing surface 42 for the passenger. Herein the bracing and/or separating element 40 forms a lateral bracing surface 42. The bracing surface 42 is oriented towards the seating area 16. The bracing surface 42 is oriented substantially orthogonally to the seating surface formed by the seating area 16. The bracing surface 42 extends substantially orthogonally to the cabin floor. The bracing and/or separating element 40 extends, spaced apart from the seat bottom unit 14, from the backrest unit 26 frontwards. On a rear end facing the backrest unit 26, the bracing and/or separating element 40 is connected to the backrest unit 26. Herein the bracing and/or separating element 40 is connected to the backrest unit 26 rigidly. For connecting the bracing and/or separating element 40 to the backrest unit 26, the bracing and/or separating element 40 and the backrest unit 26 each comprise connection regions (not shown in detail), which are embodied correspondingly and via which the bracing and/or separating element 40 is connected to the backrest unit 26 rigidly. The bracing and/or separating element 40 is connected to the backrest unit 26 via a screw-connection (not shown in detail). Principally it is also conceivable that the bracing and/or separating element 40 is connected to the backrest unit 26 via another form-fit and/or force-fit connection and/or substance-to-substance bond deemed expedient by someone skilled in the art. Principally it is also conceivable that the bracing and/or separating element 40 is coupled to the backrest unit 26 in a pivotable manner via a kinematics mechanism. The bracing and/or separating element 40 has an upper edge 44, which forms a contour of the bracing and/or separating element 40 which faces away from the seat bottom unit 14. The upper edge 44 features different heights in different regions of the bracing and/or separating element 40. In this way the bracing and/or separating element 40 is embodied of different heights in the different regions. The bracing and/or separating element 40 comprises a rear region facing towards the backrest unit 26. The bracing and/or separating element 40 comprises a middle region directly abutting on a side of the rear region of the bracing and/or separating element 40 that faces away from the backrest unit 26. In its rear region the bracing and/or separating element 40 has a height which is smaller than a height in the middle region of the bracing and/or separating element 40. In the region facing towards the backrest unit 26, the bracing and/or separating element 40 is embodied more flat to provide a free space for an elbow of the passenger sitting on the seat. Herein the upper edge 44 forms in the rear region a support surface, in particular for a passenger's elbow. The bracing and/or separating element 40 comprises a front region, which is arranged on a side of the middle region facing away from the rear region. In the front region the bracing and/or separating element 40 now has a smaller height than in the middle region. The contour is implemented in such a way that it is wave-shaped from the rear region via the middle region to the front region. In a transition from the rear region to the front region, a height of the bracing and/or separating element 40 increases in an arc, a maximum height of the bracing and/or separating element 40 being reached shortly after a transition into the middle region. From the maximum height, a height of the bracing and/or separating element 40 continuously decreases in an arc until the front end of the bracing and/or separating element 40. The bracing and/or separating element 40 forms approximately a shape of half an arrowhead.

For the purpose of implementing the support surface 38, the armrest unit 34 comprises a first support element 46. The support element 46 is configured to form, in at least one operative state, the support surface 38, which is oriented substantially in parallel to the seating surface. The support element 46 features a wing-shape. The support element 46 comprises a rear region facing towards the backrest unit 26. A rear end of the support element 46 is in a mounted state arranged spaced apart from the backrest unit 26. The first support element 46 is embodied in such a way that it is adjustable between different positions. The first support element 46 is embodied in such a way that it is pivotable. The first support element 46 is supported in such a way that it is pivotable with respect to the bracing and/or separating element 40. The first support element 46 is herein pivotable between a rest position and a usage position. In a rest position the support element 46 is folded to the bracing and/or separating element 40. In the rest position of the support element 46 the support surface 38, which forms the support element 46, is not usable for a passenger for a support. A portion of the support surface 38, which is implemented by the support element 46, faces in the rest position towards the bracing surface 42 of the bracing and/or separating element 40. In the usage position the support element 46 is folded away from the bracing and/or separating element 40. An angle between the bracing surface 42 of the bracing and/or separating element 40 and the support surface 38 of the first support element 46 is in the usage position approximately 90 degrees. In the usage position the bracing and/or separating element 40 and the support element 46 substantially implement an L-shape.

In the rest position the support element 46 forms a bracing surface 58. The bracing surface 58 of the support element 46 is implemented by an underside of the support element 46 which is situated opposite the support surface 38. In the usage position the bracing surface 58 is oriented downwards and faces towards the seat bottom unit 14. In the rest position, in which the support element 46 is folded to the bracing and/or separating element 40, the bracing surface 58 is oriented inwards, facing towards the seating area 16. A passenger may lean upon the bracing surface 58. In particular in a sleep position, in which the armrest unit 34 is not used for resting an arm, the passenger may advantageously position himself comfortably in the flight passenger seat 10 and may brace himself sideways on the bracing surface 58 of the support element 46.

The armrest unit 36 comprises a further support element 48. The further support element 48 is configured to at least partly implement the support surface 38 for the passenger. The further support element 48 is herein arranged between the bracing and/or separating element 40 and the first support element 46. The further support element 48 is rigidly connected to the bracing and/or separating element 40. Herein the further support element 48 is embodied in a one-part implementation with the bracing and/or separating element 40. Principally it is also conceivable that the further support element 48 is connected to the bracing and/or separating element 40 by a form-fit and/or force-fit connection and/or substance-to-substance bond. It is herein conceivable, for example, that the support element 48 is connected to the bracing and/or separating element 40 via a screw-connection or via adhesive bonding. A transition from the bracing surface 42 implemented by the bracing and/or separating element 40 and the support surface 38 formed by the further support element 48 is embodied by a radius.

To support the first support element 46 in such a way that it is pivotable with respect to the bracing and/or separating element 40, the armrest unit 34 comprises a hinge 50. The hinge 50 is arranged between the first support element 46 and the further support element 48. The hinge 50 is embodied partly by the first support element 46 and partly by the further support element 48. For implementing the hinge 50, the first support element 46 comprises a plurality of through holes, which are spaced apart from each other and are separated from each other by recesses. For implementing the hinge 50, the further support element 48 also comprises through holes introduced in molded-on webs, which are embodied correspondingly to the recesses comprised by the first support element 46 between its through holes. In a mounted state the webs molded to the further support element 48 are arranged in the recesses of the first support element 46, as a result of which the through holes of the first support element 46 and of the further support element 48 are in alignment. The hinge 50 comprises a pin element, which is guided through the through holes of both support elements 46, 48 of the hinge 50 for the purpose of a pivotable connection of the first support element 46 and the further support element 48. Via the pin element, the two support elements 46, 48 are pivotable with respect to each other. The pin element implements a pivot axis 52, about which the first support element 46 is pivotable with respect to the bracing and/or separating element 40. The pivot axis 52 extends in a main extension of the armrest unit 34. Herein the pivot axis 52 extends substantially in parallel to the seating direction 80. Herein the hinge 50 comprises a stopping element 138, which holds the first support element 46 in the usage position as well as in the rest position. The stopping element 138 is embodied as a stop element which is rigidly connected to the support element 46. In the usage position the stopping element 138 abuts on a stop (not shown in detail) below the support element 48, as a result of which the support element 46 is fixated in the usage position. Principally it is also conceivable that the hinge 50 comprises one or several latching elements fixating the first support element 46 in the usage position as well as in the rest position. By way of the bearing via the hinge 50, the first support element 46 is articulated to a lower end of the armrest unit 34.

The seating device comprises a first bracing element 54. The bracing element 54 spans over a region between the seat bottom unit 14 and the armrest unit 34. The seating device comprises a second bracing element 56, which forms a region between the seat bottom unit 14 and the armrest unit

34. The bracing element 56 is herein embodied mirror-symmetrically to the bracing element 54. Due to the bracing elements 54, 56 being substantially identical mirror-images of one another, only the first bracing element 34 will be described below. The following description of the first bracing element 54 may also be referred to for explaining the second bracing element 56.

The bracing element 54, which spans over the region between the seat bottom unit 14 and the armrest unit 34, is configured to allow the passenger sitting on the flight passenger seat 10 supporting himself on it with his lower back portion. The bracing element 54 is configured for a lateral support of the passenger. The bracing element 54 is arranged in the region between the seat bottom unit 14, the armrest unit 34 and the backrest unit 26. The bracing element 54 is implemented as a cover element. The bracing element 54, which is embodied as a cover element, spans between the armrest unit 34, the seat bottom unit 14 and the backrest unit 26. In this the bracing element 54, which is embodied as a cover element, is implemented by a net. Principally it is also conceivable that the bracing element 54, which is embodied as a cover element, is made of fabric or of another elastic material, e.g. leather, or of a thin plastic element. The bracing element 54 is connected to the armrest unit 34 with an upper end. The bracing element 54 extends over an entire length of the armrest unit 34. The bracing element 54 is mounted to an underside of the support element 48. Principally it is also conceivable that the bracing element 54 is mounted to a different structural component of the armrest unit 34. For the purpose of connecting the bracing element 54 to the support element 48, the bracing element 54 comprises a connection region (not shown in detail). The connection region is arranged on the upper end of the bracing element 54. The connection region herein comprises at least one connection element via which the bracing element 54 is connectable to the armrest unit 34. Herein the connection element is embodied as a form-fit and/or force-fit element, e.g. as a loop-and-hook band or as part of a zip. Principally it is also conceivable that the bracing element 54 is in the connection region connected to the armrest unit 34 via a clamp connection. Alternatively it would also be conceivable that the bracing element 54 is in its connection region connected to the armrest unit 34, in particular to the support element 48, via substance-to-substance bond, like in particular adhesive bonding.

The bracing element 54 is connected to the backrest unit 26 on a rear end. For the purpose of connecting to the backrest unit 26, the bracing element 54 comprises a connection region (not shown in detail) at its rear end. Via the connection region the bracing element 54 is connected to the first base body 28 of the backrest unit 26. The connection region herein comprises at least one connection element, via which the bracing element 54 is connectable to the first base body 28 of the backrest unit 26. Herein the connection element is embodied as a form-fit and/or force-fit element, e.g. as a loop-and-hook band or as part of a zip. Principally it is also conceivable that the bracing element 54 is connected to the base body 28 of the backrest unit 26 in its connection region via a clamp connection. Alternatively it would also be conceivable that the bracing element 54 is connected to the backrest unit 26 via a piping connection. Alternatively it would also be conceivable that the bracing element 54 is in its connection region connected to the base body 28 of the backrest unit 26 via substance-to-substance bond, like in particular adhesive bonding. In a mounted state the bracing element 54 directly abuts on the tapering in the backrest support surface 30. The bracing element 54 extends in a rear end from an upper point, in which the bracing element 54 is connected to the armrest unit 34, towards the seat bottom unit 14 inwards. The bracing element 54 merges with the backrest support surface 30 on its side facing the backrest unit 26.

On its lower end the bracing element 54 is connected to the seat bottom unit 14. The bracing element 54 is connected to the base body 18 of the seat bottom unit 14. For the purpose of connecting the bracing element 54 to the seat bottom unit 14, the bracing element 54 comprises a connection region. Via the connection region the bracing element 54 is fixedly connected to the base body 18. Principally it is also conceivable that the bracing element 54 is not fixedly connected to the base body 18 of the seat bottom unit 14 but is merely tucked in between the base body 18 and the cushioning element 20. Alternatively it would also be conceivable that the bracing element 54 is connected to the base body 18 of the seat bottom unit 14 via a piping connection. In a mounted state the bracing element 54 directly abuts on the tapering of the seat bottom unit 14. As a result, the bracing element 54 extends from a front end that is arranged approximately at the front end of the armrest unit 34, which faces away from the backrest unit 26, from an outside towards the backrest unit 26 inwards. In a point in which the tapering of the backrest support surface 30 and the tapering of the seat bottom unit 14 meet, the bracing element 54 has its furthest extension inwards. From the point in which the tapering of the backrest support surface 30 and the tapering of the seat bottom unit 14 meet, the bracing element 54 extends outwards, viewed in a seating direction 80. From the point in which the tapering of the backrest support surface 30 and the tapering of the seat bottom unit 14 meet, the bracing element 54 extends outwards as well, viewed in a direction of the backrest unit 26, i.e. viewed towards the top.

The bracing element 54 is embodied as a cover element. The bracing element 54 embodied as a cover element spans in the region between the armrest unit 34, the seat bottom unit 14 and the backrest unit 26. The bracing element 54, which is embodied as a cover element, is herein made of a flexible material. In particular, the bracing element 54, which is embodied as a cover element, is made of a textile material. The bracing element 54 is implemented of a net. Principally it is also conceivable that the bracing element 54 is made of a fabric or of another flexible material. It is herein conceivable that the bracing element 54 is, for example, embodied by a plastic panel. The implementation of the bracing element 54 as a cover element allows the bracing element 54 advantageously adapting to a contour of the passenger sitting on the flight passenger seat 10.

The armrest unit 34 comprises a stiffening element 124. The stiffening element 124 is mounted to a front end of the bracing element 54. The stiffening element 124 is configured to hold the bracing element 54 in shape in its front region. The stiffening element 124 is herein embodied as a web, which the bracing element 54 is connected to. The stiffening element 124 herein connects the armrest unit 34 to the seat bottom unit 14. The stiffening element 124 is herein arranged on the front end of the armrest unit 34 and extends from an underside of the armrest unit 34 downwards towards the seat bottom unit 14. On its lower end the stiffening element 124 is fixedly connected to the seat bottom unit 14, in particular to the base body 18 of the seat bottom unit 14. Principally it is also conceivable that the stiffening element 124 is embodied merely as a strengthening introduced into the bracing element 54 implemented of a textile material. Herein it would, for example, be conceivable that a web is sewn into the bracing element 54.

The bracing element 54 is adjustable in its length and/or in its width. In this way a hardness respectively a yieldingness of the bracing element 54 is adjustable. This allows a passenger adjusting the bracing element 54, depending on his proportional dimensions, to achieve a maximum comfort for himself. For the purpose of adjusting the length and/or width, the seating device comprises an adjusting unit (not shown in detail). The adjusting unit comprises a locking mechanism, which is capable of locking the bracing element 54, which is embodied as a cover element, to different lengths. By means of the locking mechanism a size of the bracing element 54 spanned between the seat bottom unit 14, the armrest unit 34 and the backrest unit 26 is adjustable. For this purpose the locking mechanism comprises a clamping element which clamps the bracing element 54 on one side. Depending on a hardness or softness to which the bracing element 54 is adjusted, a greater or smaller portion of the bracing element 54 in the region between the seat bottom unit 14, the armrest unit 34 and the backrest unit 26 is released. If the bracing element 54 is adjusted to be hard, a surplus portion of the bracing element 54 is arranged behind the locking mechanism and not usable by the passenger. As a result of this, the bracing element 54 features a higher tension and is not deflectable to such an extent by the passenger. If the bracing element 54 is adjusted to be softer, the surplus portion previously clamped behind the clamping element is released and is now also located in the region between the seat bottom unit 14, the armrest unit 34 and the backrest unit 26. As a result, the bracing element 54 has less tension and is thus farther deflectable by a passenger.

The flight passenger seat 10 with the seating device is positionable in a variety of seat positions. The backrest unit 26, which is connected to the seat bottom unit 14, is differently positioned in the different seat positions. A first seat position in which the backrest unit 26, respectively the flight passenger seat 10, is positionable is implemented as the comfort position. This comfort position is shown in FIG. 7. The comfort position is implemented as a base position optimized for the passenger. The base position is implemented as a position for which all parameters of the seat are configured optimally to achieve a best possible comfort for a passenger in the comfort position. In the comfort position the backrest 26 forms a backrest support surface 30 which is substantially planar. In the comfort position, which is implemented as a base position, the backrest support surface 30 has an inclination of substantially 135 degrees with respect to the mounting plane. In the comfort position the rigid lower partial region 90 of the backrest unit 26 and the pivotable upper partial region 92 are oriented substantially in a plane with respect to each other and are not pivoted with respect to each other (cf. FIG. 7). The cushioning elements 32, 114 form a substantially planar backrest support surface 30. In the comfort position there is substantially no offset in a transition between the cushioning element 32 and the cushioning element 114. The backrest unit 26, the partial regions 90, 92 of which are oriented substantially in a plane with respect to each other, and the seat bottom unit 14 include in the comfort position a sitting angle of 130 degrees, which is implemented as the base position of the flight passenger seat 10.

A further sitting position is implemented as the TTL position. In the TTL position the pivotable upper partial region 92 is positioned upright and is oriented substantially perpendicularly to the mounting plane. For an adjustment of the backrest unit 26, only the pivotable upper partial region 92 is pivoted with respect to the rigid lower partial region 90. The TTL position herein constitutes a maximum adjustment of the upper partial region 92 with respect to the lower partial region 90 of the backrest unit 26. In the TTL position the upper partial region 92 is pivoted with respect to the lower partial region 90 by substantially 30 degrees. The upper partial region 92 is herein continuously adjustable and lockable with respect to the lower partial region 90 between the comfort position and the TTL position. For locking the upper partial region 92 with respect to the lower partial region 90, the seating device comprises a locking unit, which is not shown in detail. The locking unit locks the upper partial region 92 in the different positions with respect to the lower partial region 90. It is herein conceivable that the locking unit comprises, for example, a compression spring which fixates the two partial regions 90, 92 with respect to each other and which is unlockable by the operator via an actuation element for the purpose of adjusting the two partial regions 90, 92. Herein a locking unit is conceivable which is known from the prior art and is configured for locking a backrest unit 26 with respect to a seat bottom unit 14.

FIGS. 9 and 10 respectively show a portion of a layout with a plurality of flight passenger seats 10, 60, 62 with the seating device according to the invention. In the layout shown as an example, the flight passenger seats 10, 60, 62 are mounted in the airplane cabin. Principally there are, of course, other layouts conceivable which are deemed expedient by someone skilled in the art and in which the flight passenger seats 10, 60, 62 are arranged in a different manner. As may be perceived in FIG. 9, the flight passenger seats 10, 62 are arranged in a longitudinal seat row 120 one behind the other one. The flight passenger seats 10, 62, which are arranged in the longitudinal seat row 120 one behind the other one, herein have a pitch distance of 33 inches. In a longitudinal seat row 120 herein preferably more than ten flight passenger seats 10, 62 are arranged one behind the other one in the airplane cabin. In the comfort position of the flight passenger seat 10, the backrest unit 26 of the frontward flight passenger seat 10 extends until over a seat bottom unit 122 of the rearward flight passenger seat 62. In the vertical direction the frontward flight passenger seat 10 and the rearward flight passenger seat 62 overlap at least partly. Herein in particular an upper partial region 92 of the backrest unit 26 is arranged, viewed in a vertical direction, above the seat bottom unit 122 of the rearward flight passenger seat 62. In the comfort position an overlap of the backrest unit 26 of the frontward flight passenger seat 10 with the seat bottom unit 122 of the rearward flight passenger seat 62 is herein 3.5 inches. Principally it is also conceivable that an overlap is implemented greater or smaller than this. Principally it is, however, also conceivable that the two flight passenger seats 10, 62, which are arranged one behind the other one, do not overlap. In a TTL position of the backrest unit 26 of the frontward flight passenger seat 10, the back rest unit 26 has no overlap with the rearward flight passenger seat 62. In a TTL position of the frontward flight passenger seat 10, this allows a passenger getting into his flight passenger seat 62 in an advantageously simple manner. Herein all flight passenger seats 10, 62 arranged in a longitudinal seat row 120 are respectively arranged at an equal distance from one another.

In FIGS. 12 to 14 a further exemplary embodiment of the invention is shown. The following description and the drawings are substantially restricted to the differences between the exemplary embodiments, wherein regarding identically designated structural components, in particular regarding structural components having the same reference numerals, principally the drawings and/or the description of the other exemplary embodiment of FIGS. 1 to 11 may be referred to. For distinguishing the exemplary embodiments, the letter a has been added to the reference numerals of the second exemplary embodiment in FIGS. 12 to 14.

FIGS. 12 and 13 show a seating device according to the invention in a second exemplary embodiment. The seating device is implemented as a flight passenger seating device. The seating device is implemented as a portion of a seat, in particular as a portion of a flight passenger seat 10a. The seating device comprises a mounting unit 12a. The mounting unit 12a is configured for mounting the flight passenger seat 10a on a cabin floor. The seating device comprises a seat bottom unit 14a. The seat bottom unit 14a is configured to provide a seating area 16a allowing a passenger to sit on, in particular during a flight. The seating area 16a forms a seat surface which the passenger sits on. The seat bottom unit 14a is connected to the mounting unit 12a. The seat bottom unit 14a is rigidly connected to the mounting unit 12a. The seat bottom unit 14a comprises a base body 18a. The base body 18a of the seat bottom unit 14a is connected to the mounting unit 12a. The base body 18a is implemented at least partly of a fiber-composite material. Principally it is also conceivable that the base body 18a is implemented of a metal, like in particular a magnesium. Herein the base body 18a is particularly preferably implemented of a magnesium diecast.

The seating device comprises a backrest unit 26a. The backrest unit 26a is configured to allow a passenger sitting on the flight passenger seat 10a to lean his back against it. The backrest unit 26a is mounted on a rear end of the seat bottom unit 14a. The backrest unit 26a delimits the seating area 16a to the rear. The backrest unit 26a is rigidly connected to the seat bottom unit 14a. The backrest unit 26a comprises a rigid partial region 90a. The rigid partial region 90a is embodied as a lower region of the backrest unit 26a. The rigid lower partial region 90a faces towards the seat bottom unit 14a. The lower partial region 90a of the backrest unit 26a forms a first base body 28a of the backrest unit 26a. The base body 28a of the backrest unit 26a herein partially implements a supporting structure of the backrest unit 26a. The first base body 28a of the backrest unit 26a is embodied in a one-part implementation with the base body 18a of the seat bottom unit 14a. Herein the base body 28a of the rigid lower partial region 90a is implemented of a thin-walled rear wall 66a, a thin-walled front wall 68a and a stiffening element 70a arranged between the thin-walled rear wall 66a and the thin-walled front wall 68a. Principally the base body 28a of the lower partial region 90a may herein also be embodied as a frame with a covering. It is herein conceivable that the frame, which constitutes a portion of the base body 28a, is made of a metal or of a fiber-composite material. A covering made of fabric is herein connected to the frame under tension, forming a bracing surface for the passenger.

The backrest unit 26a comprises an upper partial region 92a. The upper partial region 92a is implemented in such a way that it is pivotable with respect to the lower partial region 90a. The backrest unit 26a comprises a second base body 94a implementing the upper partial region 92a. The base body 94a is herein substantially made of a fiber-composite material. The base body 94a of the upper partial region 92a may herein also be embodied as a frame with a covering. It is herein conceivable that the frame forming a portion of the base body 94a is made of a metal or of a fiber-composite material. A covering made of fabric is herein connected to the frame under tension, implementing a bracing surface for the passenger. The backrest unit 26a comprises a support unit 100a. Via the support unit 100a the lower partial region 90a and the upper partial region 92a are pivotable with respect to each other. The support unit 100a pivotably connects the first base body 28a of the backrest unit 26a, which implements the lower partial region 90a, to the second base body 94a of the backrest unit 26a. The support unit 100a comprises a pivot axis 102a about which the upper partial region 92a is pivotable with respect to the lower partial region 90a. The support unit 100a further comprises a spring element (not shown in detail). The spring element is configured to exert a force onto the upper partial region 92a resulting in said upper partial region 92a being pushed toward the TTL position of the flight passenger seat 10a. When adjusting into the TTL position, passenger hence encounters a resistance and may thus achieve the TTL position in a comfortable fashion. In case of an adjustment out of the TTL position, the spring element provides a supporting force.

The seating device also comprises a first armrest unit 34a. Furthermore the seating device comprises a second armrest unit 36a. The two armrest units 34a, 36a are configured to delimit the seating area 16a laterally. The armrest units 34a, 36a delimit the seating area 16a on respectively two opposite sides of the seat bottom unit 14a. The armrest units 34a, 36a each comprise respectively one base body 140a. The base body 140a of the armrest units 34a, 36a respectively comprises a support unit 142a. By means of the support unit 142a the base bodies 142a of the armrest units 34a, 36a are arranged with the lower partial region 90a of the backrest unit 26a. Via the support unit 142a the armrest units 34a, 36a are pivotable with respect to the backrest unit 26a. Herein the armrest units 34a, 36a are adjustable between a usage position, in which they are oriented substantially in parallel to the seat bottom unit 14a, and a stowage position, in which they are oriented substantially in parallel to the lower partial region 90a of the backrest unit 26a. The armrest units 34a, 36a each comprise a comfort element 144a. The comfort element 144a is respectively arranged on an upper side of the base body 140a of the respective armrest units 34a, 36a. The comfort element 144a is fixedly connected to the respective base body 140a. The comfort element 144a is herein made of a soft synthetics material and forms a support surface for the passenger. Principally it is also conceivable that the comfort element 144a is made at least partly or entirely of a silicone. Herein it is moreover conceivable that the comfort element 144a features a coating.

The backrest unit 26a comprises a locking unit 146a, which is configured to lock the support unit 100a, by means of which the backrest unit 26a is adjustable, in different positions. In a locked state of the locking unit 146a, the lower partial region 90a and the upper partial region 92a of the backrest unit 26a are fixated with respect to each other. In the locked state of the locking unit 146a, the lower partial region 90a and the upper partial region 92a of the backrest unit 26a are not pivotable with respect to one another. For this purpose the locking unit 146a comprises latching elements (not shown in detail). In an unlocked state of the locking unit 146a, the lower partial region 90a and the upper partial region 92a of the backrest unit 26a are released with respect to one another and are pivotable with respect to each other via the support unit 100a. To actuate the locking unit 146a, the seating device comprises an actuation unit 148a. The actuation unit 148a is herein arranged at least partly in the armrest unit 34a. The actuation unit 148a comprises a rod arrangement 150a, via which the locking unit 146a is actuatable. The rod arrangement 150a is supported in the base body 140*a* of the armrest unit 34*a* in such a way that it is axially displaceable. The actuation unit 148*a* comprises an actuation lever 152*a*, which is rotatably supported in the backrest unit 26*a* and is configured to unlock the locking unit 146*a* in an actuated state. The actuation unit 148*a* comprises a spring element 154*a*. The spring element 154*a* is configured to exert onto the actuation lever 152*a* a force that moves the actuation lever 152*a* into a position in which the actuation lever 152*a* locks the locking unit 146*a*. The spring element 154*a* is herein embodied as a leaf spring. Principally it is also conceivable that the spring element 154*a* is embodied as a different kind of spring deemed expedient by someone skilled in the art, e.g. as a helical spring. The actuation unit 148*a* comprises an operating element 170*a*, via which a passenger may operate the actuation unit 148*a*. The operating element 170*a* is herein mounted on an underside of the armrest unit 34*a*. The operating element 170*a* is herein implemented as a lever which is displaceable by a passenger. Principally it is also conceivable that the operating element 170*a* is embodied, for example, as a rotary knob, as a tilt lever or as any other actuation element that is deemed expedient by someone skilled in the art. Via the actuation element 170*a*, a passenger may displace the rod arrangement 150*a* axially along a displacement axis 172*a*, deflecting as a result the actuation lever 152*a* counter to the resilient force of the spring element 154*a* and thus unlocking the locking unit 146*a*. The passenger may then, by way of a force acting onto the upper partial region 92*a* of the backrest unit 26*a*, pivot the upper partial region 92*a* of the backrest unit 26*a* with respect to the lower partial region 90*a*. If the passenger then releases the operating element, the spring element 154*a* will push the actuation lever 152*a* back into its locking position and the locking unit 146*a* is locked again. Principally it is also conceivable that, for example, the entire armrest unit 34*a*, or at least the base body 140*a* of the armrest unit 34*a*, forms the rod arrangement and is axially displaced as a whole by a passenger for unlocking the locking unit 146*a*.

The seating device comprises a table unit 156*a*. The table unit 156*a* is configured to be arranged on a rear side of the backrest unit 26*a*. The table unit 156*a* is herein arranged at the lower partial region 90*a* of the backrest unit 26*a*. The table unit 156*a* is arranged on the rear side of the lower partial region 90*a* of the backrest unit 26*a* in such a way that it is pivotable. The table unit 156*a* comprises a base body 158*a*, which forms a table surface 160*a* of the table unit 156*a*. For connecting the table unit 156*a*, the table unit 156*a* comprises a support unit 162*a*. The support unit 162*a* is arranged on a lower end of the base body 158*a* of the table unit 156*a*. The support unit 162*a* comprises two support levers 164*a*, 166*a*. Herein respectively one support lever 164*a*, 166*a* is arranged on a side of the base body 158*a* of the table unit 156*a* on the underside. The support levers 164*a*, 166*a* extend away from the table surface 160*a* of the base body 140*a* by approximately 100 degrees. Herein the support levers 164*a*, 166*a* have a slightly curved extent. The support levers 164*a*, 166*a* herein feature an extent of less than 15 cm. Particularly preferably the support levers 164*a*, 166*a* have an extent of less than 10 cm. The support levers 164*a*, 166*a* have an extent of 6 cm. The support levers 164*a*, 166*a* are each connected to the backrest unit 26*a* pivotably via a pivot bearing on an end that faces away from the base body 158*a*. The short support levers 164*a*, 166*a* for connecting the table unit 156*a* especially advantageously allow providing leg space for a passenger as in particular long, downwards extending support levers for the table unit are dispensed with. Furthermore, the short support levers 164*a*, 166*a* allow achieving advantageous weight-saving. The lower partial region 90*a* of the backrest unit 26*a* forms one stop element 168*a* per support lever 164*a*, 166*a*, on which the respective support lever 164*a*, 166*a* abuts in a folded-out state of the table unit 156*a*.

REFERENCE NUMERALS 10 flight passenger seat
12 mounting unit
14 seat bottom unit
16 seating area
18 base body
20 cushioning element
22 rear region
24 front region
26 backrest unit
28 base body
30 backrest support surface
32 cushioning element
34 armrest unit
36 armrest unit
38 support surface
40 bracing and/or separating element
42 bracing surface
44 upper edge
46 support element
48 support element
50 hinge
52 pivot axis
54 bracing element
56 bracing element
58 bracing surface
60 flight passenger seat
62 flight passenger seat
64 seat row
66 thin-walled rear wall
68 thin-walled front wall
70 stiffening element
72 front region
74 partial region
76 partial region
78 transverse direction
80 seating direction
82 slit
84 rear
86 front end
88 slit
90 rigid lower partial region
92 upper partial region
94 base body
96 thin-walled rear wall
98 thin-walled front wall
100 support unit
102 pivot axis
104 elevation
106 elevation
108 support element
110 stop element
112 stop element
114 cushioning element
116 abutment element
118 abutment element
120 longitudinal seat row
122 seat bottom unit
124 stiffening element
126 headrest 128 headrest element
130 bracing element
132 bracing element
134 linear guidance
136 guiding rail
138 stop element
140 base body
142 support unit
144 comfort element
146 locking unit
148 actuation unit
150 rod arrangement
152 actuation unit
154 spring element
156 table unit
158 base body
160 table surface
162 support unit
164 bearing lever
166 bearing lever
168 stop element
170 operating element
172 displacement axis

The invention claimed is:

1. A seating device comprising at least one seat bottom unit and a backrest unit that is connected to the seat bottom unit, wherein the backrest unit comprises (a) a rigid partial region which is rigidly coupled with the seat bottom unit and (b) an upper partial region, which is embodied in such a way that it is pivotable with respect to the rigid lower partial region, wherein at least the backrest unit is positionable (i) in a comfort position, which is implemented as a base position that is optimized for a passenger comfort, in which a backrest unit of the seating device has an inclination that is pivoted out of a TTL position backwards, allowing a non-upright sitting position for a passenger, and (ii) in a further sitting position, in which the backrest unit has a different inclination with respect to a cabin floor than in the comfort position, further comprising (c) at least one support unit, which supports the rigid lower partial region with the pivotable upper partial region, and forms a pivot axis, which is offset in a seating direction frontwards with respect to a rear end of the backrest unit.

2. The seating device according to claim 1, comprising at least one laterally arranged abutment element extending from the backrest unit frontwards in a region of the at least one support unit.

3. The seating device according to claim 1, wherein the backrest unit and the seat bottom unit have a sitting angle of at least 120 degrees in the base position.

4. The seating device according to claim 1, wherein the backrest unit features in the base position an inclination of at least 120 degrees with respect to a mounting plane.

5. The seating device according to claim 1, wherein a seating area of the seat bottom unit comprises a base body implementing at least in a front region at least two partial regions, which are separate from each other in a transverse direction and are movable with respect to each other in height.

6. The seating device according to claim 5, wherein the base body forms, at least in its front region, at least one slit separating the at least two partial regions from each other.

7. The seating device according to claim 5, comprising at least one armrest unit, which delimits the seating area laterally.

8. The seating device at least according to claim 7, wherein the armrest unit comprises at least one bracing and/or separating element which is oriented substantially perpendicularly to the seat bottom unit, and at least one support element, which is pivotably connected thereto.

9. The seating device according to claim 7, comprising at least one bracing element, wherein the bracing element spans at least over a region between the seat bottom unit, the armrest unit and/or the backrest unit.

10. The seating device at least according to claim 8, wherein in a rest position of the at least one support element, a bracing element directly abuts on a bracing surface of the at least one support element.

11. The seating device according to claim 1, wherein the backrest unit forms a backrest support surface, which features a tapering in its lower region.

12. A layout with a plurality of flight passenger seats comprising a seating device according to claim 1, wherein at least two flight passenger seats are arranged one behind the other one, wherein a backrest unit of the frontward flight passenger seat extends in a comfort position until over a seat bottom unit of the rearward flight passenger seat.

13. The layout according to claim 12, wherein an overlap of the backrest unit of the frontward flight passenger seat with the seat bottom unit of the rearward flight passenger seat is in a comfort position at least 3.5 inches.

14. A seating device comprising at least one seat bottom unit and a backrest unit that is connected to the seat bottom unit, wherein the backrest unit comprises (a) a rigid partial region which is rigidly coupled with the seat bottom unit and (b) an upper partial region, which is embodied in such a way that it is pivotable with respect to the rigid lower partial region, wherein at least the backrest unit is positionable (i) in a comfort position, which is implemented as a base position that is optimized for a passenger comfort, in which the backrest unit of the seating device has an inclination that is pivoted out of a TTL position backwards, allowing a non-upright sitting position for a passenger, and (ii) in a further sitting position, in which the backrest unit has a different inclination with respect to a cabin floor than in the comfort position, further comprising (c) at least one laterally arranged abutment element extending from the backrest unit frontwards in a region of a support unit.

15. A seating device comprising at least one seat bottom unit and a backrest unit that is connected to the seat bottom unit, wherein the backrest unit comprises (a) a rigid partial region which is rigidly coupled with the seat bottom unit and (b) an upper partial region, which is embodied in such a way that it is pivotable with respect to the rigid lower partial region, wherein at least the backrest unit is positionable (i) in a comfort position, which is implemented as a base position that is optimized for a passenger comfort, in which the backrest unit of the seating device has an inclination that is pivoted out of a TTL position backwards, allowing a non-upright sitting position for a passenger, and (ii) in a further sitting position, in which the backrest unit has a different inclination with respect to a cabin floor than in the comfort position, wherein the backrest unit and the seat bottom unit have a sitting angle of at least 120 degrees in the base position.

* * * * *